United States Patent
Low et al.

(10) Patent No.: US 11,810,449 B2
(45) Date of Patent: Nov. 7, 2023

(54) WRIST REST

(71) Applicant: RAZER (ASIA-PACIFIC) PTE. LTD., Singapore (SG)

(72) Inventors: Kok Kiong Low, Singapore (SG); Chang Sern Gwee, Singapore (SG); Alvin Sim, Singapore (SG)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 187 days.

(21) Appl. No.: 17/297,440

(22) PCT Filed: Dec. 7, 2018

(86) PCT No.: PCT/SG2018/050598
§ 371 (c)(1),
(2) Date: May 26, 2021

(87) PCT Pub. No.: WO2020/117127
PCT Pub. Date: Jun. 11, 2020

(65) Prior Publication Data
US 2022/0012992 A1 Jan. 13, 2022

(51) Int. Cl.
*G08B 6/00* (2006.01)
*G06F 3/01* (2006.01)

(52) U.S. Cl.
CPC ............... *G08B 6/00* (2013.01); *G06F 3/016* (2013.01)

(58) Field of Classification Search
CPC .................................... G08B 6/00; G06F 3/00
(Continued)

(56) References Cited

U.S. PATENT DOCUMENTS 6,695,800 B1   2/2004   Gary et al.
7,106,305 B2   9/2006   Rosenberg
(Continued)

FOREIGN PATENT DOCUMENTS

CN   203480448 U   3/2014
CN   106598300 A   4/2017
(Continued)

OTHER PUBLICATIONS

Extended European Search Report dated Nov. 23, 2021, 11 pages, for the corresponding European Patent Application No. 18942019.3.
(Continued)

*Primary Examiner* — Jack K Wang
(74) *Attorney, Agent, or Firm* — Polsinelli PC

(57) ABSTRACT

The wrist rest may include a base structure; at least two flexible supports extending from the base structure; a vibration assembly supported on the at least two flexible supports in a manner such that the vibration assembly may be spaced apart from the base structure; and a cushion assembly including a cushion disposed over the vibration assembly in a manner so as to conceal the vibration assembly between the base structure and the cushion. The cushion may be secured to the base structure. The at least two flexible supports may be configured to isolate the base structure from a vibrating motion of the vibration assembly. A surface of the vibration assembly directed towards the cushion assembly may move relative to a corresponding surface of the cushion assembly in a manner so as to allow the vibration motion of the vibration assembly to be sensed through the cushion.

19 Claims, 8 Drawing Sheets

(58) Field of Classification Search
USPC .................................................... 340/407.1
See application file for complete search history.

(56) References Cited

U.S. PATENT DOCUMENTS

| | | | |
|---|---|---|---|
| 7,110,810 B2 | 9/2006 | Preston et al. | |
| 7,300,026 B2 | 11/2007 | Pap | |
| 7,336,266 B2 | 2/2008 | Hayward et al. | |
| 7,567,232 B2 | 7/2009 | Rosenberg | |
| 8,769,352 B1 | 7/2014 | Sun et al. | |
| 2004/0164971 A1* | 8/2004 | Hayward | G06F 3/03547 345/179 |
| 2006/0232564 A1* | 10/2006 | Nishimura | G06F 1/18 345/173 |
| 2008/0023597 A1* | 1/2008 | Wyner | A61F 7/007 248/118.3 |
| 2011/0032090 A1 | 2/2011 | Provancher | |
| 2011/0309212 A1* | 12/2011 | Guerrieri | H05B 3/347 248/118 |
| 2012/0162143 A1 | 6/2012 | Kai et al. | |
| 2013/0002584 A1 | 1/2013 | Leem et al. | |
| 2014/0191973 A1 | 7/2014 | Zellers et al. | |
| 2016/0070348 A1 | 3/2016 | Cowley et al. | |

FOREIGN PATENT DOCUMENTS

| | | |
|---|---|---|
| CN | 206209638 U | 5/2017 |
| TW | 201716939 A | 5/2017 |

OTHER PUBLICATIONS

International Search Report and Written Opinion, dated Sep. 6, 2019, for the corresponding International Application No. PCT/SG2018/050598 in 11 pages.
Taiwan Patent Application No. 108141791A; Office Action dated Mar. 17, 2023; 39 pages.

* cited by examiner

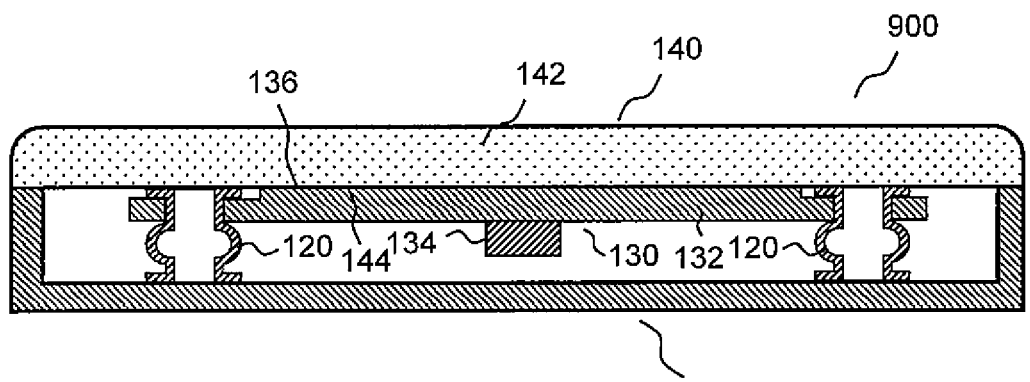
FIG. 9A
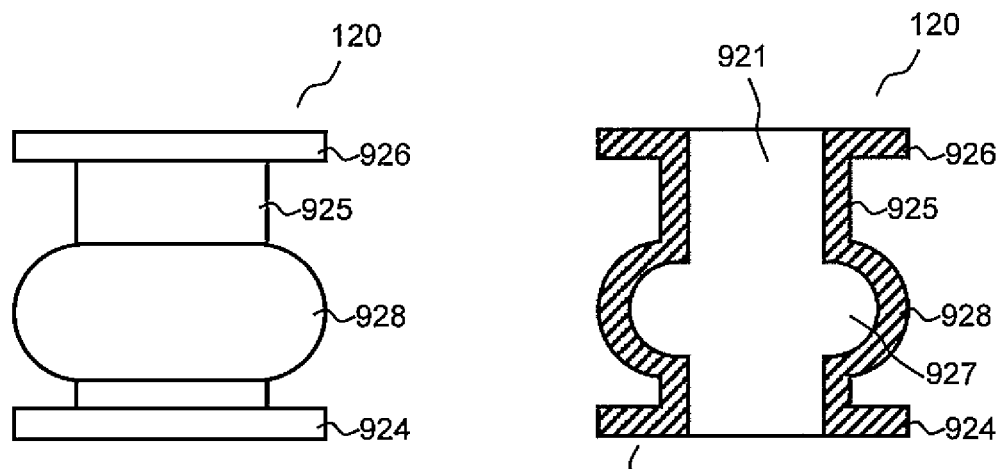
FIG. 9B
FIG. 9C
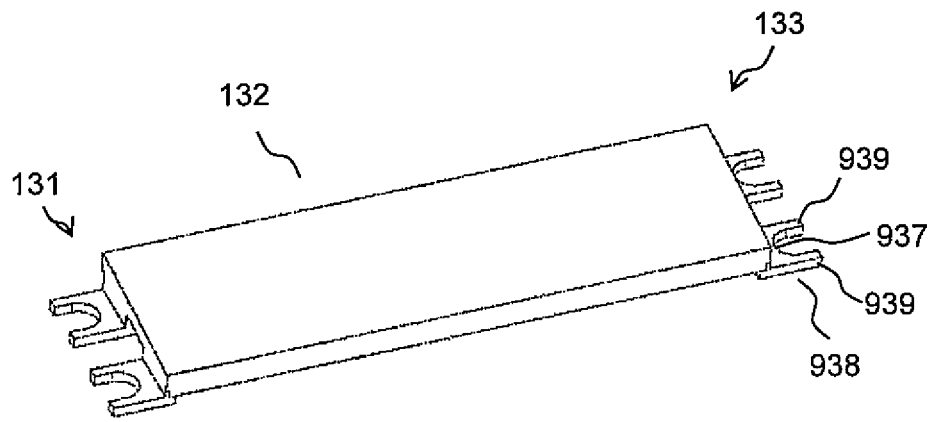
FIG. 9D

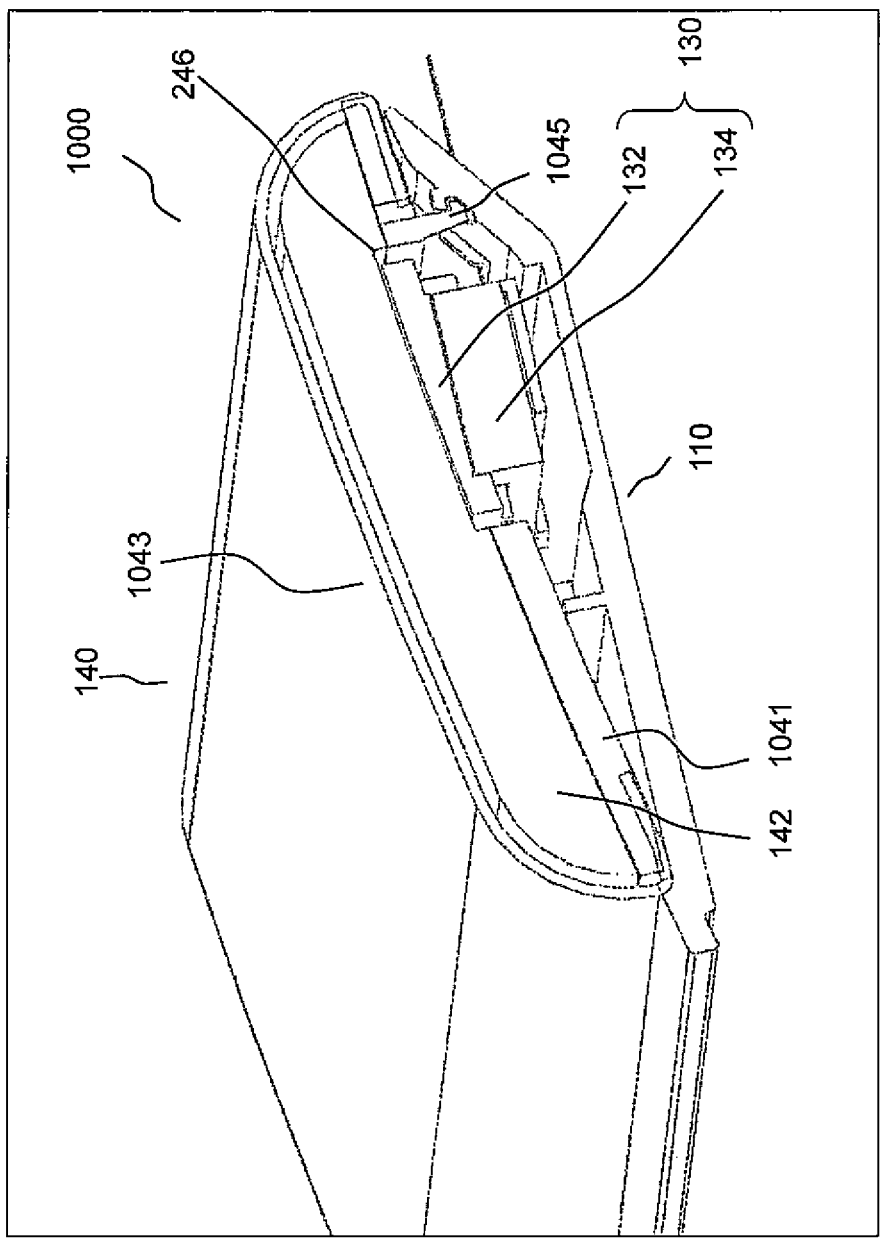

WRIST REST

TECHNICAL FIELD

Various embodiments generally relate to a wrist rest. In particular, various embodiments generally relate to a wrist rest with haptic feedback.

BACKGROUND

In recent years, gaming input devices, such as keyboard, mouse, gamepad, joystick etc., with in-built haptic feedback have been gaining popularity among the garners as these devices enhance the garners experience in their interaction with the gaming environment. With the success of inbuilt haptic feedback for gaming input devices, manufacturer are moving towards introducing inbuilt haptic feedback in other gaming accessories such as wrist rest.

For example, U.S. Pat. No. 7,106,305 discloses a wrist rest including actuator(s) to provide haptic feedback to a user. However, in said US patent, the actuator is coupled to the housing of the wrist rest and the actuator applies a force directly to the housing such that the force is transmitted to the user contacting the housing as haptic feedback. Accordingly, the entire housing of the wrist rest would be vibrating to generate the haptic feedback. Providing haptic feedback in a wrist rest in such a raw and crude manner may not be ideal as it may cause discomfort to the user or may even interfere with the user who is trying to control the gaming input devices. Further, with the entire wrist-rest vibrating, the wrist-rest may move along a surface of a table and may fall off the table if left unattended.

On the other hand, other common haptic feedback technology which involves directly moving a tactile element (whereby the user contacts the tactile element) relative to a housing so as to deliver the haptic sensation through the tactile element may also not be suitable for a wrist rest as it would require directly moving an entire cushion of the wrist rest relative to a housing of the wrist rest. Generating haptic feedback in a wrist rest in such a basic and raw manner would cause the cushion of the wrist rest to directly rub against the skin of the user which may cause discomfort and may interfere with the user who is trying to control the gaming input devices. Thus, directly applying such common haptic feedback technology in a wrist rest is also not ideal.

Accordingly, there is a need for a refined and subtle solution of generating haptic feedback in a wrist rest which may minimise discomfort and/or interference with the user's action.

SUMMARY

According to various embodiments, there is provided a wrist rest. The wrist rest may include a base structure. The wrist rest may further include at least two flexible supports extending from the base structure. The wrist rest may further include a vibration assembly supported on the at least two flexible supports in a manner such that the vibration assembly may be spaced apart from the base structure by the at least two flexible supports. The wrist rest may further include a cushion assembly including a cushion disposed over the vibration assembly in a manner so as to conceal the vibration assembly between the base structure and the cushion. The cushion may be secured to the base structure. The at least two flexible supports may be configured to isolate the base structure from a vibrating motion of the vibration assembly. The vibrating motion of the vibration assembly may cause a surface of the vibration assembly directed towards the cushion assembly to move relative to a corresponding surface of the cushion assembly directed towards the vibration assembly in a manner so as to allow the vibration motion of the vibration assembly to be sensed through the cushion of the cushion assembly.

According to various embodiments, there is provided a wrist rest. The wrist rest may include a base structure. The wrist rest may further include at least two flexible supports extending from the base structure. The wrist rest may further include a vibration assembly including a vibration member and an actuator. The vibration member may be supported on the at least two flexible supports in a manner such that the vibration member may be spaced apart from the base structure by the at least two flexible supports. The actuator may be coupled underneath the vibration member and between the at least two flexible supports so as to be suspended from the vibration member. The wrist rest may further include a cushion assembly including a cushion disposed over the vibration assembly in a manner so as to conceal the vibration assembly between the base structure and the cushion. The cushion may be secured to the base structure. The wrist rest may further include a lubricating layer between the vibration member of the vibration assembly and the cushion of the cushion assembly. The at least two flexible supports may be configured to isolate the base structure from the vibrating motion of the vibration assembly. The vibrating motion of the vibration member of the vibration assembly may causes a surface of the vibration member of the vibration assembly directed towards the cushion assembly to move relative to a corresponding surface of the cushion of the cushion assembly directed towards the vibration assembly. The lubricating layer may be configured to minimise vibration losses of the vibration member of the vibration assembly and facilitate the relative movement between the vibration member of the vibration assembly and the cushion of the cushion assembly.

According to various embodiments, there is provided a wrist rest. The wrist rest may include a base structure. The wrist rest may further include at least two flexible supports extending from the base structure. The wrist rest may further include a vibration assembly including a vibration member and an actuator. The vibration member may be supported on the at least two flexible supports in a manner such that the vibration member may be spaced apart from the base structure by the at least two flexible supports. The actuator may be coupled underneath the vibration member and between the at least two flexible supports so as to be suspended from the vibration member. The wrist rest may further include a cushion assembly including a cushion which may be disposed over the vibration assembly in a manner so as to conceal the vibration assembly between the base structure and the cushion. The cushion may be secured to the base structure. The wrist rest may further include a lubricating plate fixedly attached to a side of the cushion of the cushion assembly directed towards the vibration plate. A vibrating motion of the vibration member of the vibration assembly may cause a surface of the vibration member of the vibration assembly directed towards the cushion assembly to move relative to a corresponding surface of the lubricating plate directed towards the vibration assembly. The at least two flexible supports may be configured to isolate the base structure from the vibrating motion of the vibration assembly. The lubricating plate may be in contact with the vibration member of the vibration assembly to minimise vibration losses of the vibration member of the vibration assembly and facilitate the relative movement between the vibration member of the vibration assembly and the cushion of the cushion assembly.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 9A shows a schematic diagram of a front cross-sectional view of a wrist rest according to various embodiments;

FIG. 9B shows a front view of the flexible support of the wrist rest of FIG. 9A according to various embodiments;

FIG. 9C shows a front cross-sectional view of the flexible support of the wrist rest 900 of FIG. 9A according to various embodiments;

FIG. 9D shows a perspective view of the vibration member of the vibration assembly of the wrist rest of FIG. 9A according to various embodiments;

FIG. 10A shows a side cross-sectional view at a midpoint of a wrist rest according to various embodiments;

DETAILED DESCRIPTION

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a wrist rest. The wrist rest may be configured to generate a haptic feedback in response to a signal from a processor. The processor may be a host computer running an application and directly sending the signal to the wrist rest. The processor may also be a local controller in the wrist rest which receives haptic feedback instructions from a host computer running an application. According to various embodiments, the wrist rest may be configured to provide comfort and support for a wrist of a user who is using input devices such as a keyboard, a mouse, a gamepad, a joystick etc. According to various embodiments, a wrist rest may also be referred to as a wrist cushion or a wrist pad or a wrist padding or a wrist support.

In various embodiments, a haptic feedback in the wrist rest may be generated in a refined and subtle manner. According to various embodiments, when generating the haptic feedback, a housing (or a casing or an exterior structure or a base structure) of the wrist rest may remain stationary with respect to a surface on which the wrist rest is placed. According to various embodiments, when generating the haptic feedback, a cushion (or a padding) of the wrist rest may also not be actively (or directly) moved relative to the housing of the wrist rest. Rather, according to various embodiments, a vibration is generated internally of the wrist rest in a manner such that the vibration may be sensed through the cushion of the wrist rest as a form of haptic feedback. Accordingly, haptic sensation may be delivered to the user in an elegant and subtle manner which may not cause much discomfort to the user and/or may not interfere with the user's usage of the input device.

Figure 1:
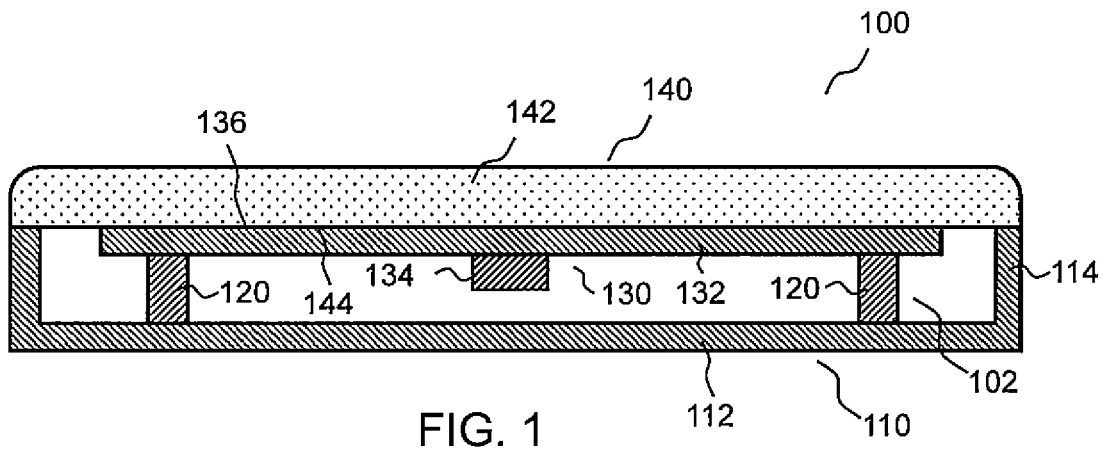
FIG. 1 shows a schematic diagram of a front cross-sectional view of a wrist rest according to various embodiments.

FIG. 1 shows a schematic diagram of a front cross-sectional view of a wrist rest 100 according to various embodiments. As shown, according to various embodiments, the wrist rest 100 may include a base structure 110. According to various embodiments, the base structure 110 may be a bottom housing or a bottom casing or a bottom exterior structure of the wrist rest 100. According to various embodiments, the base structure 110 may include a floor portion 112. According to various embodiments, the base structure 110 may include one or more sidewalls 114 extending upwardly from the floor portion 112 of the base structure 110 at one or more corresponding edges of the floor portion 112 of the base structure 110. According to various embodiments, the base structure 110 may be of an elongate shape. Accordingly, the floor portion 112 of the base structure 110 may be of an elongate panel-like shape. Further, according to various embodiments, the base structure 110 may include at least two side walls 114, each extending upwardly from a corresponding end edge of the elongate floor portion 112 of the base structure 110.

As shown, according to various embodiments, the wrist rest 100 may further include at least two flexible supports 120 extending from the base structure 110. According to various embodiments, each of the at least two flexible supports 120 may be extending at least substantially vertically or upwardly from the floor portion 112 of the base structure 110 in a manner so as to be column-like or pillar-like. Accordingly, each of the at least two flexible supports 120 may be at least substantially perpendicular to the floor portion 112 of the base structure 110. According to various embodiments, the at least two flexible supports 120 may be extending from the floor portion 112 of the base structure 110 within the at least two side walls 114 at respective end edges of the floor portion 112 of the base structure 110. According to various embodiments, the at least two flexible supports 120 may be made of flexible material, such as rubber, or elastomer, or dense foam material, etc., so as to be bendable and/or pliable. According to various embodiments, the at least two flexible supports may be springs. According to various embodiment, the at least two flexible supports 120 may include two or three or four or more flexible supports 120.

As shown, according to various embodiments, the wrist rest 100 may include a vibration assembly 130 supported on the at least two flexible supports 120 in a manner such that the vibration assembly 130 may be spaced apart from the base structure 110 by the at least two flexible supports 120. Accordingly, the at least two flexible supports 120 may serve as a spacer between the vibration assembly 130 and the base structure, 110 so as to hold or suspend the vibration assembly 130 a distance from (and above) the base structure 110. According to various embodiments, the at least two flexible supports 120 may be between the vibration assembly 130 and the base structure 110. Accordingly, one end of each of the at least two flexible supports may be coupled to the base structure 110 and another end of each of the at least two flexible supports may be coupled to the vibration assembly 130. Hence, the vibration assembly 130 may not be in direct contact with the base structure 110.

According to various embodiments, the vibration assembly 130 may include a vibration member 132 and an actuator 134. According to various embodiments, the vibration member 132 of the vibration assembly 130 may be supported by the at least two flexible supports 120. Accordingly, the at least two flexible supports 120 may hold or suspend the vibration member 132 of the vibration assembly a distance from (and above) the base structure 110 such that the vibration member 132 is spaced apart from the base structure 110. According to various embodiments, one end of each of the at least two flexible supports may be coupled to the base structure 110 and the other end of each of the at least two flexible supports may be coupled to the vibration member 132 of the vibration assembly 130. According to various embodiments, the actuator 134 of the vibration assembly 130 may be coupled underneath the vibration member 132 of the vibration assembly 130 and between the at least two flexible supports 120 so as to be suspended from the vibration member 132 of the vibration assembly 130. Accordingly, the actuator 134 of the vibration assembly 130 may be attached to a bottom surface 133 of the vibration member 132 of the vibration assembly 130 such that the actuator 134 of the vibration assembly 130 may be hanging from the vibration member 132 of the vibration assembly 130. Further, the actuator 134 of the vibration assembly 130 may be located between the at least two flexible supports 120. According to various embodiments, the vibration assembly 130 may include one or more actuators 134 coupled to the vibration member 132. Further, the one or more actuators 134 may be located between the at least two flexible supports 120. According to various embodiments, the actuator 134 of the vibration assembly 130 may be at a mid-point of a length of the vibration member 132 of the vibration assembly 130 between the at least two flexible supports 120. According to various embodiments, the vibration member 132 may be a vibration plate which may be elongate in shape.

As shown, according to various embodiments, the wrist rest 100 may include a cushion assembly 140 comprising a cushion 142 disposed over the vibration assembly 130 in a manner so as to conceal the vibration assembly 130 between the base structure 110 and the cushion 142, wherein the cushion 142 of the cushion assembly 140 may be secured to the base structure 110. Accordingly, the cushion 142 of the cushion assembly 140 may be attached to the base structure 110 and may cover across the base structure 110 in a manner so as to enclose an internal space 102 of the wrist rest 100. Hence, the vibration assembly 130 may be contained within the internal space 102 of the wrist rest 100 as defined by the cushion 142 of the cushion assembly 140 and the base structure 110 such that the vibration assembly 140 may be enclosed inside the wrist rest 100. According to various embodiments, the cushion may be made of sponge or foam or polyester. According to various embodiments, the vibration member 132 of the vibration assembly 130 may be loosely abutting the cushion assembly 140. Accordingly, the vibration member 132 of the vibration assembly 130 may be immediately adjacent to the cushion assembly 140 such that the vibration member 132 of the vibration assembly 130 may be in contact or may be touching the cushion assembly 140. The vibration member 132 of the vibration assembly 130 may not be fastened or attached or fixed or joined to the cushion assembly 140. For example, the vibration member 132 of the vibration assembly 130 may be loosely abutting the cushion 142 of the cushion assembly 140 in a manner such that the vibration member 132 of the vibration assembly 130 may be in contact or may be touching the cushion 142 of the cushion assembly 140 without being fastened or attached or fixed or joined to each other.

According to various embodiments, the vibration assembly 130 may be set into a vibrating motion. According to various embodiments, the vibrating motion of the vibration assembly 130 may be a vibrating motion of the vibration member 132 of the vibration assembly 130. Accordingly, the actuator 134 of the vibration assembly 130 may be configured to be operable to vibrate the vibration member 132 of the vibration assembly 130 so as to set the vibration member 132 of the vibration assembly 130 into the vibrating motion in response to a signal received from a processor to generate haptic feedback in the wrist rest 100. Hence, the vibration member 132 of the vibration assembly 130 may be set into the vibrating motion by the actuator 134 as and when a haptic feedback is required for the wrist rest 100. According to various embodiments, the processor may be a host computer running an application and directly sending the signal to the actuator 134 of the vibration assembly 130 for generating the haptic feedback. According to various embodiments, the processor may also be a local processor in the wrist rest 100 which receives haptic feedback instructions from a host computer running an application and which in turn sends the signal to the actuator 134 of the vibration assembly 130 for generating the haptic feedback. According to various embodiments, the processor may be understood as any kind of a logic implementing entity, which may be special purpose circuitry or a processor executing software stored in a memory, firmware, or any combination thereof. Thus, the processor may be a hard-wired logic circuit or a programmable logic circuit such as a programmable processor (e.g. Programmable Logic Controller (PLC)), e.g. a microprocessor (e.g. a Complex Instruction Set Computer (CISC) processor or a Reduced Instruction Set Computer (RISC) processor). The processor may also be a processor executing software, e.g. any kind of computer program, e.g. a computer program using a virtual machine code such as e.g. Java. According to various embodiments, the processor may be integrated or enclosed in the wrist rest 100 or may be a separate device connected to the wrist rest 100.

According to various embodiments, the at least two flexible supports 120 may be configured to isolate the base structure 110 from the vibrating motion of the vibration assembly 130. According to various embodiments, the at least two flexible supports 120 may isolate the base structure 110 from the vibrating motion of the vibration member 132 of the vibration assembly 130. Accordingly, the at least two flexible supports 120, which are made of flexible material, may serve to absorb and/or damp vibration so as to prevent the transfer of vibration from the vibration member 132 of the vibration assembly 130 to the base structure 110 in order to isolate the base structure 110 from the vibrating motion of the vibration member 132 of the vibration assembly 130. According to various embodiments, when the vibrating motion of the vibration member 132 of the vibration assembly 130 is in a x-y plane with respect to the base structure 110, the at least two flexible supports 120 may bend or flex or sway or twist or deflect accordingly to a certain extent so as to absorb or damp the vibrating motion in the x-y plane. According to various embodiments, when the vibrating motion of the vibration member 132 of the vibration assembly 130 is in a z-direction with respect to the base structure 110, the at least two flexible supports 120 may stretch or compress or buckle or flex or twist or distort or deform accordingly to a certain extend so as to absorb or damp the vibrating motion in the z-direction.

According to various embodiments, the at least two flexible supports 120 may also be configured to provide a biasing force along the respective axial direction in a manner such that when a wrist of a user is rested on the wrist rest 100, the at least two flexible supports 120 may urge or press towards the wrist of the user such that the vibrating motion of the vibration member 132 of the vibration assembly 130 is not affected or reduced by the pressure from the wrist of the user and may be sensed by the user's wrist as a form of haptic feedback.

According to various embodiments, the vibrating motion of the vibration assembly 130 may cause a surface of the vibration assembly 130 (or a topmost surface of the vibration assembly 130) directed towards the cushion assembly 140 to move relative to a corresponding surface of the cushion assembly 140 (or a bottommost surface of the cushion assembly 140) directed towards the vibration assembly 130 in a manner so as to allow the vibration motion of the vibration assembly 130 to be sensed through the cushion 142 of the cushion assembly 140. According to various embodiments, the surface of the vibration assembly 130 (or the topmost surface of the vibration assembly 130) directed towards the cushion assembly 140 may be a surface 136 (or top surface) of the vibration member 132 of the vibration assembly 130 which is facing the cushion assembly 140. Accordingly, the surface 136 of the vibration member 132 of the vibration assembly 130 and the corresponding surface of the cushion assembly 140 (or the bottommost surface of the cushion assembly 140) may be opposing and facing each other. According to various embodiments, the surface 136 of the vibration member 132 of the vibration assembly 130 may be loosely abutting the corresponding surface of the cushion assembly 140. Accordingly, the surface 136 of the vibration member 132 of the vibration assembly 130 may be immediately adjacent to the corresponding surface of the cushion assembly 140 such that the surface 136 of the vibration member 132 of the vibration assembly 130 may be in contact or may be touching the corresponding surface of the cushion assembly 140. Further, the surface 136 of the vibration member 132 of the vibration assembly 130 may not be fastened or attached or fixed or joined to the corresponding surface of the cushion assembly 140. Hence, as the vibration assembly 130 is being set into the vibrating motion, the surface 136 of the vibration member 132 of the vibration assembly 130 may move relative to the corresponding surface of the cushion assembly 140 such that the wrist of the user resting on the wrist rest 100 may sense the vibrating motion of the vibration member 132 of the vibration assembly 130 immediately underneath the cushion 142 of the cushion assembly 140. Thus, an indirect haptic feedback may be generated by the vibration assembly 130 which may be sensed through the cushion assembly 140 of the wrist rest 100.

According to various embodiment, the corresponding surface of the cushion assembly 140 (or the bottommost surface of the cushion assembly 140) may be a corresponding surface 144 (or a bottom surface) of the cushion 142 of the cushion assembly 140 directed towards the vibration assembly 130. Accordingly, the surface 136 (or the top surface) of the vibration member 132 of the vibration assembly 130 may be loosely abutting the corresponding surface 144 (or the bottom surface) of the cushion 142 of the cushion assembly 140 in a manner such that the surface 136 of the vibration member 132 of the vibration assembly 130 may be in contact or may be touching the corresponding surface 144 of the cushion 142 of the cushion assembly 140 without being fastened or attached or fixed or joined to each other. Hence, the vibrating motion of the vibration member 132 of the vibration assembly 130 may cause the surface 136 of the vibration member 132 of the vibration assembly 130 to move relative to the corresponding surface 144 of the cushion 142 of the cushion assembly 140 such that the wrist of the user resting on the wrist rest 100 may sense the vibrating motion of the vibration member 132 of the vibration assembly 130 through the cushion 142 of the cushion assembly 140 which is in contact with the vibration member 132 of the vibration assembly 130. Hence, the user may indirectly sense the haptic feedback generated by the vibrating motion of the vibration member 132 of the vibration assembly 130 through the cushion 142 of the cushion assembly 140.

Figure 2A:
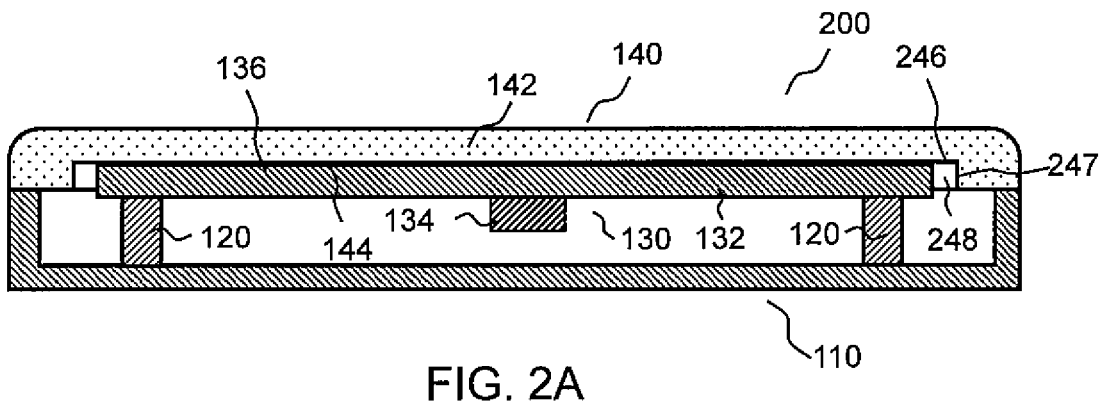
FIG. 2A shows a schematic diagram of a front cross-sectional view of a wrist rest according to various embodiments.
Figure 2B:
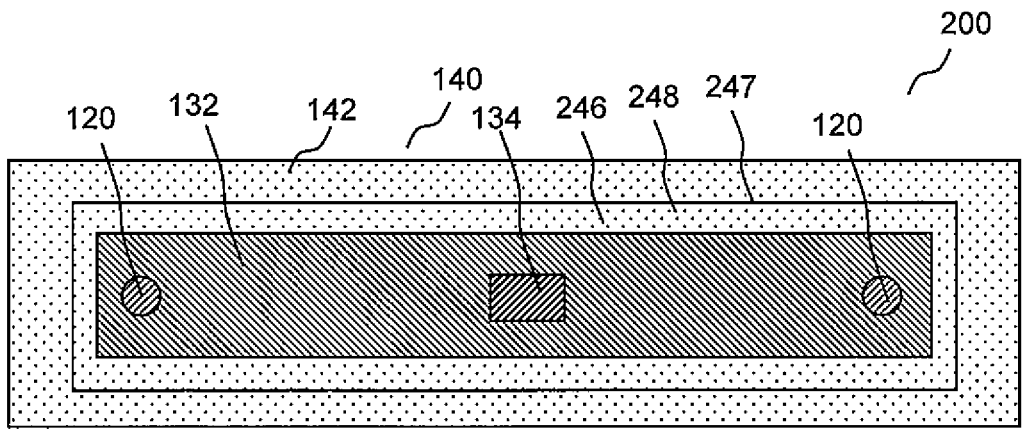
FIG. 2B shows a bottom view of the wrist rest of FIG. 2A with the base structure removed according to various embodiments.

FIG. 2A shows a schematic diagram of a front cross-sectional view of a wrist rest 200 according to various embodiments. FIG. 2B shows a bottom view of the wrist rest 200 of FIG. 2A with the base structure removed according to various embodiments. According to various embodiments, the wrist rest 200 of FIG. 2A and FIG. 2B may contain all the features of the wrist rest 100 of FIG. 1. Accordingly, all features, changes, modifications, and variations that are applicable to the wrist rest 100 of FIG. 1 may also be applicable to the wrist rest 200 of FIG. 2A and FIG. 2B. According to various embodiments, the wrist rest 200 of FIG. 2A and FIG. 2B may differ from the wrist rest 100 of FIG. 1 in that the wrist rest 200 of FIG. 2A may include the following additional features and/or limitations.

As shown in FIG. 2A and FIG. 2B, according to various embodiments, the cushion 142 of the cushion assembly 140 may include a recessed portion 246. According to various embodiments, the recessed portion 246 of the cushion 142 may be a cut out portion of the cushion 142 forming an indentation or a trench into the cushion 142. According to various embodiments, the recessed portion 246 may be on the corresponding surface 144 of the cushion 142 of the cushion assembly 140 which is directed towards the vibration assembly 130.

According to various embodiments, the cushion 142 of the cushion assembly 140 may be disposed over the vibration member 132 of the vibration assembly 130 with the vibration member 132 arranged within the recessed portion 246 of the cushion 142 of the cushion assembly 140. Accordingly, the vibration member 132 of the vibration assembly 130 (or at least a portion of the vibration member 132 of the vibration assembly 130) may be fitted into the recessed portion 246 of the cushion 142 of the cushion assembly 140 when the cushion 142 of the cushion assembly is placed over the vibration assembly 130 and secured to the base structure 110. Hence, the cushion 142 of the cushion assembly 140 may surround a periphery of the vibration member 132 of the vibration assembly 130.

According to various embodiments, the recessed portion 246 of the cushion 142 of the cushion assembly 140 may be larger than the vibration member 132 of the vibration assembly 130. According to various embodiments, a planar area of the recessed portion 246 of the cushion 142 of the cushion assembly 140 may be larger than a corresponding planar area of the vibration member 132 of the vibration assembly 130 such that an endless gap 248 surround the vibration member 132 of the vibration assembly 130 between the periphery of the vibration member 132 and perimeter walls 247 of the recessed portion 246 of the cushion 142 of the cushion assembly 140. Accordingly, the endless gap 248 may provide room for the vibration member 132 of the vibration assembly 130 to move relative to the cushion 142 of the cushion assembly 140 in all directions along the corresponding planar area of the vibration member 132 of the vibration assembly 130.

According to various embodiments, a fluid or gel may be filled between the recessed portion 246 of the cushion 142 and the vibration member 132 of the vibration assembly 130. Accordingly, the endless gap 248 between the recessed portion 246 of the cushion 142 and the vibration member 132 of the vibration assembly 130 may be filled with the fluid or gel. According to various other embodiments, the endless gap 248 between the recessed portion 246 of the cushion 142 and the vibration member 132 of the vibration assembly 130 may be an air gap free of any filler. The endless gap allows the vibration member 132 move in horizontal directions.

Figure 3:
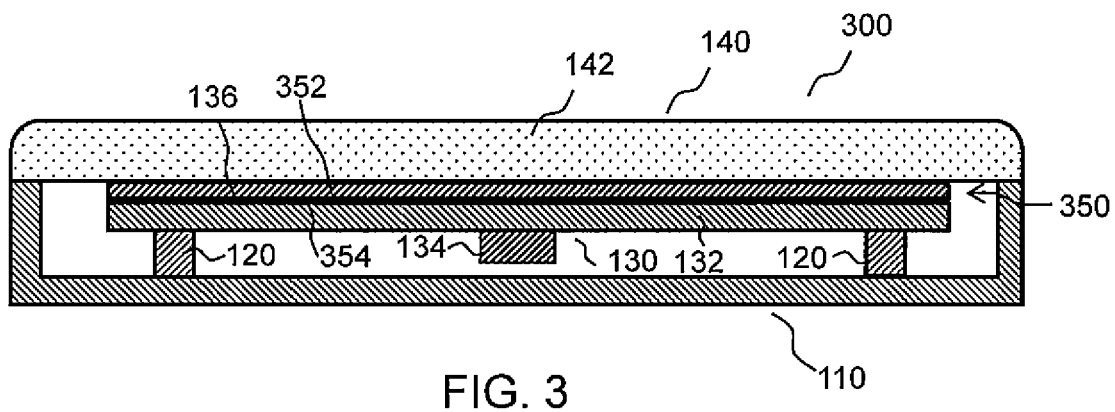
FIG. 3 shows a schematic diagram of a front cross-sectional view of a wrist rest according to various embodiments.

FIG. 3 shows a schematic diagram of a front cross-sectional view of a wrist rest 300 according to various embodiments. According to various embodiments, the wrist rest 300 of FIG. 3 may contain all the features of the wrist rest 100 of FIG. 1. Accordingly, all features, changes, modifications, and variations that are applicable to the wrist rest 100 of FIG. 1 may also be applicable to the wrist rest 300 of FIG. 3. According to various embodiments, the wrist rest 300 of FIG. 3 may differ from the wrist rest 100 of FIG. 1 in that the wrist rest 300 of FIG. 3 may include the following additional features and/or limitations. It is understood that while the additional features and/or limitations of the wrist rest 300 of FIG. 3 are described with reference to the wrist rest 100 of FIG. 1 in the following, the additional features and/or limitations of the wrist rest 300 of FIG. 3 may also be combined with the wrist rest 200 of FIG. 2A and FIG. 2B according to various embodiments.

As shown in FIG. 3, according to various embodiments, the wrist rest 300 of FIG. 3 may include a lubricating layer 350 between the vibration member 132 of the vibration assembly 130 and the cushion 142 of the cushion assembly 140. According to various embodiments, the lubricating layer 350 may be configured to minimise vibration losses of the vibration member 132 of the vibration assembly 130 and facilitate the relative movement between the vibration member 132 of the vibration assembly 130 and the cushion 142 of the cushion assembly 140. Accordingly, the lubricating layer 350 may reduce friction between the vibration member 132 of the vibration assembly 130 and the cushion 142 of the cushion assembly 140.

As shown in FIG. 3, according to various embodiments, the lubricating layer 350 may be in the form of a lubricating plate 352 of the cushion assembly 140 fixedly attached to a side of the cushion 142 of the cushion assembly 140 directed towards the vibration member 132 of the vibration assembly 130 in a manner so as to be opposing and facing the vibration member 132 of the vibration assembly 130 such that the lubricating plate 352 may be in direct contact with the vibration member 132 of the vibration assembly 130. According to various embodiments, the lubricating plate 352 may be attached to the corresponding surface 144 (or the bottom surface) of the cushion 142 of the cushion assembly 140 such that the lubricating plate 352 may be directed towards the vibration member 132 of the vibration assembly 130. Accordingly, the lubricating plate 352 may be sandwiched in between the surface 136 (or the top surface) of the vibration member 132 of the vibration assembly 130 and the corresponding surface 144 (or the bottom surface) of the cushion 142 of the cushion assembly 140.

According to various embodiments, since the lubricating plate 352 is fixedly attached to the cushion 142 of the cushion assembly 140, the lubricating plate 352 may be considered part of the cushion assembly 140. Accordingly, the corresponding surface of the cushion assembly 140 (or the bottommost surface of the cushion assembly 140) to which the surface 136 (or the top surface) of the vibration member 132 of the vibration assembly 130 may be loosely abutting a corresponding surface 354 (or a bottom surface) of the lubricating plate 352. Accordingly, the surface 136 (or the top surface) of the vibration member 132 of the vibration assembly 130 may be loosely abutting the corresponding surface 354 (or the bottom surface) of the lubricating plate 352 of the cushion assembly 140 in a manner such that the surface 136 of the vibration member 132 of the vibration assembly 130 may be in contact or may be touching the corresponding surface 354 of lubricating plate 352 without being fastened or attached or fixed or joined to each other. Hence, the vibrating motion of the vibration member 132 of the vibration assembly 130 may cause the surface 136 of the vibration member 132 of the vibration assembly 130 to move relative to the corresponding surface 354 of the lubricating plate 352 such that the wrist of the user resting on the wrist rest 300 may sense the vibrating motion of the vibration member 132 of the vibration assembly 130 through the cushion 142 of the cushion assembly 140 whereby the lubricating plate 352 of the cushion assembly 140 is in contact with the vibration member 132 of the vibration assembly 130.

According to various embodiments, the lubricating plate 352 may be fixedly attached to the cushion 142 of the cushion assembly 140 via adhesive or glue. Accordingly, the lubricating plate 352 may be stuck to the corresponding surface 144 (or the bottom surface) of the cushion 142 of the cushion assembly 140 via adhesive or glue.

Figure 4:
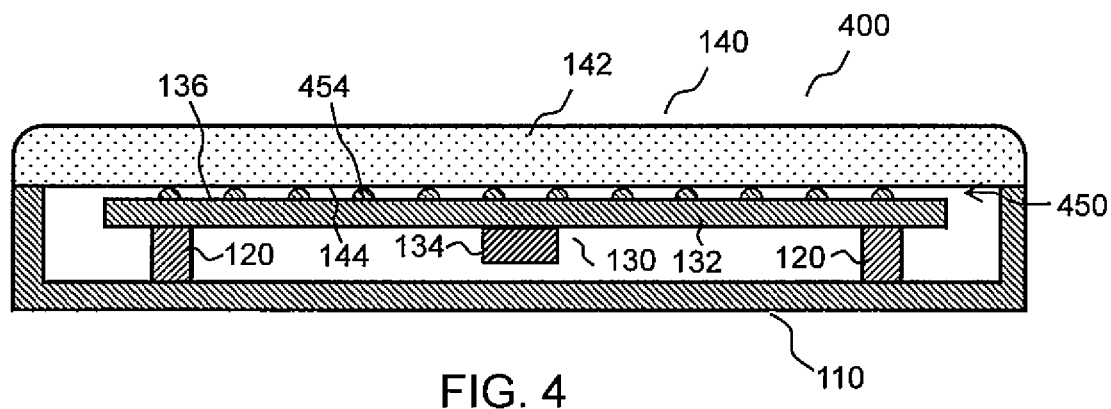
FIG. 4 shows a schematic diagram of a front cross-sectional view of a wrist rest according to various embodiments.

FIG. 4 shows a schematic diagram of a front cross-sectional view of a wrist rest 400 according to various embodiments. According to various embodiments, the wrist rest 400 of FIG. 4 may contain all the features of the wrist rest 100 of FIG. 1. Accordingly, all features, changes, modifications, and variations that are applicable to the wrist rest 100 of FIG. 1 may also be applicable to the wrist rest 400 of FIG. 4. According to various embodiments, the wrist rest 400 of FIG. 4 may differ from the wrist rest 100 of FIG. 1 in that the wrist rest 400 of FIG. 4 may include the following additional features and/or limitations. It is understood that while the additional features and/or limitations of the wrist rest 400 of FIG. 4 are described with reference to the wrist rest 100 of FIG. 1 in the following, the additional features and/or limitations of the wrist rest 400 of FIG. 4 may also be combined with the wrist rest 200 of FIG. 2A and FIG. 2B and/or the wrist rest 300 of FIG. 3 in any combination according to various embodiments.

As shown in FIG. 4, according to various embodiments, the wrist rest 400 of FIG. 4 may include a lubricating layer 450 between the vibration member 132 of the vibration assembly 130 and the cushion 142 of the cushion assembly 140. According to various embodiments, the lubricating layer 450 may be configured to minimise vibration losses of the vibration member 132 of the vibration assembly 130 and facilitate the relative movement between the vibration member 132 of the vibration assembly 130 and the cushion 142 of the cushion assembly 140. Accordingly, the lubricating layer 450 may reduce friction between the vibration member 132 of the vibration assembly 130 and the cushion 142 of the cushion assembly 140.

As shown in FIG. 4, according to various embodiments, the lubricating layer 450 may be in the form of bumps or rounded protrusions 454 projecting from the surface 136 (or the top surface) of the vibration member 132 of the vibration assembly 130 directed towards the cushion assembly 140. According to various embodiments, the bumps or rounded protrusions 454 may be integrally molded or integrally formed with the vibration member 132 of the vibration assembly 130 such that the vibration member 132 together with the bumps or rounder protrusions 454 forms a single one-piece unit as a whole. According to various embodiments, the bumps or rounded protrusions 454 may be lined along a length of the vibration member 132 of the vibration assembly 130 at regular interval.

According to various embodiments, the surface of the vibration assembly 130 (or the topmost surface of the vibration assembly 130) and the corresponding surface of the cushion assembly 140 (or the bottommost surface of the cushion assembly 130) may be opposing and facing each other. In FIG. 4, according to various embodiments, the bumps or rounded protrusions 454 on the surface 136 (or the top surface) of the vibration member 132 of the vibration assembly 130 may be loosely abutting the corresponding surface of the cushion assembly 140. Accordingly, the bumps or rounded protrusions 454 on the surface 136 of the vibration member 132 of the vibration assembly 130 may be immediately adjacent to the corresponding surface of the cushion assembly 140 such that the bumps or rounded protrusions 454 on the surface 136 of the vibration member 132 of the vibration assembly 130 may be in contact or may be touching the corresponding surface of the cushion assembly 140. Further, the bumps or rounded protrusions 454 on the surface 136 of the vibration member 132 of the vibration assembly 130 may not be fastened or attached or fixed or joined to the corresponding surface of the cushion assembly 140. Hence, as the vibration assembly 130 is being set into the vibrating motion, the bumps or rounded protrusions 454 on the surface 136 of the vibration member 132 of the vibration assembly 130 may move relative to the corresponding surface of the cushion assembly 140 such that the wrist of the user resting on the wrist rest 100 may sense the vibrating motion of the vibration member 132 of the vibration assembly 130 immediately underneath the cushion 142 of the cushion assembly 140.

According to various embodiment, the corresponding surface of the cushion assembly 140 (or the bottommost surface of the cushion assembly 140) may be a corresponding surface 144 (or a bottom surface) of the cushion 142 of the cushion assembly 140 directed towards the vibration assembly 130. Accordingly, the bumps or rounded protrusions 454 on the surface 136 (or the top surface) of the vibration member 132 of the vibration assembly 130 may be loosely abutting the corresponding surface 144 (or the bottom surface) of the cushion 142 of the cushion assembly 140 in a manner such that the bumps or rounded protrusions 454 on the surface 136 of the vibration member 132 of the vibration assembly 130 may be in contact or may be touching the corresponding surface 144 of the cushion 142 of the cushion assembly 140 without being fastened or attached or fixed or joined to each other. Hence, the vibrating motion of the vibration member 132 of the vibration assembly 130 may cause the bumps or rounded protrusions 454 on the surface 136 of the vibration member 132 of the vibration assembly 130 to move relative to the corresponding surface 144 of the cushion 142 of the cushion assembly 140 such that the wrist of the user resting on the wrist rest 100 may sense the vibrating motion of the vibration member 132 of the vibration assembly 130 through the cushion 142 of the cushion assembly 140 which is in contact with the vibration member 132 of the vibration assembly 130.

According to various embodiments, the bumps or rounded protrusions 454 on the surface 136 (or the top surface) of the vibration member 132 of the vibration assembly 130 may minimise contact with the corresponding surface 144 (or the bottom surface) of the cushion 142 of the cushion assembly 140 so as to minimise friction in order to minimise vibration losses of the vibration member 132 of the vibration assembly 130 and facilitate the relative movement between the vibration member 132 of the vibration assembly 130 and the cushion 142 of the cushion assembly 140.

Figure 5:
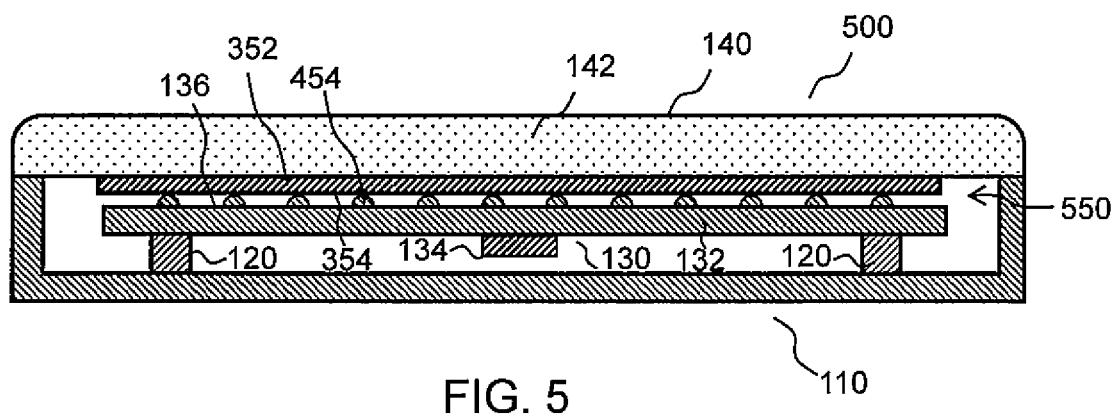
FIG. 5 shows a schematic diagram of a front cross-sectional view of a wrist rest wherein the feature and/or limitation relating to the bumps or rounded protrusions on the surface (or the top surface) of the vibration member of the vibration assembly of the wrist rest of FIG. 4 is combined with the wrist rest of FIG. 3 according to various embodiments.

As an example illustrating that the feature and/or limitation relating to the bumps or rounded protrusions 454 on the surface 136 (or the top surface) of the vibration member 132 of the vibration assembly 130 of the wrist rest 400 of FIG. 4 may be combined with other embodiments, FIG. 5 shows a schematic diagram of a front cross-sectional view of a wrist rest 500 wherein the feature and/or limitation relating to the bumps or rounded protrusions 454 on the surface 136 (or the top surface) of the vibration member 132 of the vibration assembly 130 of the wrist rest 400 of FIG. 4 is combined with the wrist rest 300 of FIG. 3 according to various embodiments. As shown in FIG. 5, according to various embodiments, the corresponding surface of the cushion assembly 140 (or the bottommost surface of the cushion assembly 140) to which the bumps or rounded protrusions 454 on the surface 136 (or the top surface) of the vibration member 132 of the vibration assembly 130 may be loosely abutting may be the corresponding surface 354 (or a bottom surface) of the lubricating plate 352 of the cushion assembly 140. Accordingly, the bumps or rounded protrusions 454 on the surface 136 (or the top surface) of the vibration member 132 of the vibration assembly 130 may be loosely abutting the corresponding surface 354 (or the bottom surface) of the lubricating plate 352 of the cushion assembly 140 in a manner such that the bumps or rounded protrusions 454 on the surface 136 of the vibration member 132 of the vibration assembly 130 may be in contact or may be touching the corresponding surface 354 of lubricating plate 352 without being fastened or attached or fixed or joined to each other. Hence, the vibrating motion of the vibration member 132 of the vibration assembly 130 may cause the bumps or rounded protrusions 454 on the surface 136 of the vibration member 132 of the vibration assembly 130 to move relative to the corresponding surface 354 of the lubricating plate 352 such that the wrist of the user resting on the wrist rest 300 may sense the vibrating motion of the vibration member 132 of the vibration assembly 130 through the cushion 142 of the cushion assembly 140 whereby the lubricating plate 352 of the cushion assembly 140 is in contact with the bumps or rounded protrusions 454 on the vibration member 132 of the vibration assembly 130.

According to various embodiments, the lubricating layer 550 of the wrist rest 500 of FIG. 5 may include the bumps or rounded protrusions 454 on the surface 136 (or the top surface) of the vibration member 132 of the vibration assembly 130 and the lubricating plate 352 of the cushion assembly 140. According to various embodiments, the bumps or rounded protrusions 454 on the surface 136 (or the top surface) of the vibration member 132 of the vibration assembly 130 may minimise contact with the corresponding surface 354 (or a bottom surface) of the lubricating plate 352 of the cushion assembly 140 so as to minimise friction in order to minimise vibration losses of the vibration member 132 of the vibration assembly 130 and facilitate the relative movement between the vibration member 132 of the vibration assembly 130 and the cushion 142 of the cushion assembly 140.

Figure 6:
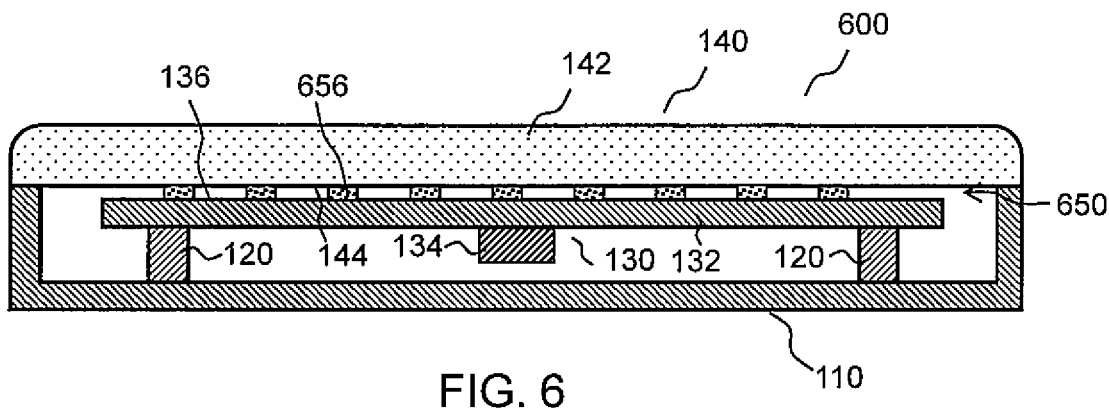
FIG. 6 shows a schematic diagram of a front cross-sectional view of a wrist rest according to various embodiments.

FIG. 6 shows a schematic diagram of a front cross-sectional view of a wrist rest 600 according to various embodiments. According to various embodiments, the wrist rest 600 of FIG. 6 may contain all the features of the wrist rest 100 of FIG. 1. Accordingly, all features, changes, modifications, and variations that are applicable to the wrist rest 100 of FIG. 1 may also be applicable to the wrist rest 600 of FIG. 6. According to various embodiments, the wrist rest 600 of FIG. 6 may differ from the wrist rest 100 of FIG. 1 in that the wrist rest 600 of FIG. 6 may include the following additional features and/or limitations. It is understood that while the additional features and/or limitations of the wrist rest 600 of FIG. 6 are described with reference to the wrist rest 100 of FIG. 1 in the following, the additional features and/or limitations of the wrist rest 600 of FIG. 6 may also be combined with the wrist rest 200 of FIG. 2A and FIG. 2B and/or the wrist rest 300 of FIG. 3 in any combination according to various embodiments.

As shown in FIG. 6, according to various embodiments, the wrist rest 600 of FIG. 6 may include a lubricating layer 650 between the vibration member 132 of the vibration assembly 130 and the cushion 142 of the cushion assembly 140. According to various embodiments, the lubricating layer 650 may be configured to minimise vibration losses of the vibration member 132 of the vibration assembly 130 and facilitate the relative movement between the vibration member 132 of the vibration assembly 130 and the cushion 142 of the cushion assembly 140. Accordingly, the lubricating layer 650 may reduce friction between the vibration member 132 of the vibration assembly 130 and the cushion 142 of the cushion assembly 140.

As shown in FIG. 6, according to various embodiments, the lubricating layer 650 may be in the form of one or more lubricating pad 656 made of self-lubricating material attached the surface 136 (or the top surface) of the vibration member 132 of the vibration assembly 130 directed towards the cushion assembly 140. According to various embodiments, the one or more lubricating pad 656 may be attached to the vibration member 132 of the vibration assembly 130 via glue or adhesive. According to various embodiments, the one or more lubricating pad 656 may be lined along a length of the vibration member 132 of the vibration assembly 130 at regular interval. According to various embodiments, the one or more lubricating pad 656 may be of various shapes and sizes. According to various embodiments, the one or more lubricating pad 656 may be in the form of one elongate strip. According to various embodiments, the one or more lubricating pad 656 may include two or more pads distributed along the length of the vibration member 132 of the vibration assembly 130 at regular interval.

According to various embodiments, the surface of the vibration assembly 130 (or the topmost surface of the vibration assembly 130) and the corresponding surface of the cushion assembly 140 (or the bottommost surface of the cushion assembly 130) may be opposing and facing each other. In FIG. 6, according to various embodiments, the one or more lubricating pad 656 on the surface 136 (or the top surface) of the vibration member 132 of the vibration assembly 130 may be loosely abutting the corresponding surface of the cushion assembly 140. Accordingly, the one or more lubricating pad 656 on the surface 136 of the vibration member 132 of the vibration assembly 130 may be immediately adjacent to the corresponding surface of the cushion assembly 140 such that the one or more lubricating pad 656 on the surface 136 of the vibration member 132 of the vibration assembly 130 may be in contact or may be touching the corresponding surface of the cushion assembly 140. Further, the one or more lubricating pad 656 on the surface 136 of the vibration member 132 of the vibration assembly 130 may not be fastened or attached or fixed or joined to the corresponding surface of the cushion assembly 140. Hence, as the vibration assembly 130 is being set into the vibrating motion, the one or more lubricating pad 656 on the surface 136 of the vibration member 132 of the vibration assembly 130 may move relative to the corresponding surface of the cushion assembly 140 such that the wrist of the user resting on the wrist rest 100 may sense the vibrating motion of the vibration member 132 of the vibration assembly 130 immediately underneath the cushion 142 of the cushion assembly 140.

According to various embodiment, the corresponding surface of the cushion assembly 140 (or the bottommost surface of the cushion assembly 140) may be a corresponding surface 144 (or a bottom surface) of the cushion 142 of the cushion assembly 140 directed towards the vibration assembly 130. Accordingly, the one or more lubricating pad 656 on the surface 136 (or the top surface) of the vibration member 132 of the vibration assembly 130 may be loosely abutting the corresponding surface 144 (or the bottom surface) of the cushion 142 of the cushion assembly 140 in a manner such that the one or more lubricating pad 656 on the surface 136 of the vibration member 132 of the vibration assembly 130 may be in contact or may be touching the corresponding surface 144 of the cushion 142 of the cushion assembly 140 without being fastened or attached or fixed or joined to each other. Hence, the vibrating motion of the vibration member 132 of the vibration assembly 130 may cause the one or more lubricating pad 656 on the surface 136 of the vibration member 132 of the vibration assembly 130 to move relative to the corresponding surface 144 of the cushion 142 of the cushion assembly 140 such that the wrist of the user resting on the wrist rest 100 may sense the vibrating motion of the vibration member 132 of the vibration assembly 130 through the cushion 142 of the cushion assembly 140 which is in contact with the vibration member 132 of the vibration assembly 130.

According to various embodiments, the one or more lubricating pad 656 on the surface 136 (or the top surface) of the vibration member 132 of the vibration assembly 130 may be self-lubricating such that it may reduce friction with the corresponding surface 144 (or the bottom surface) of the cushion 142 of the cushion assembly 140 so as to minimise vibration losses of the vibration member 132 of the vibration assembly 130 and facilitate the relative movement between the vibration member 132 of the vibration assembly 130 and the cushion 142 of the cushion assembly 140.

Figure 7:
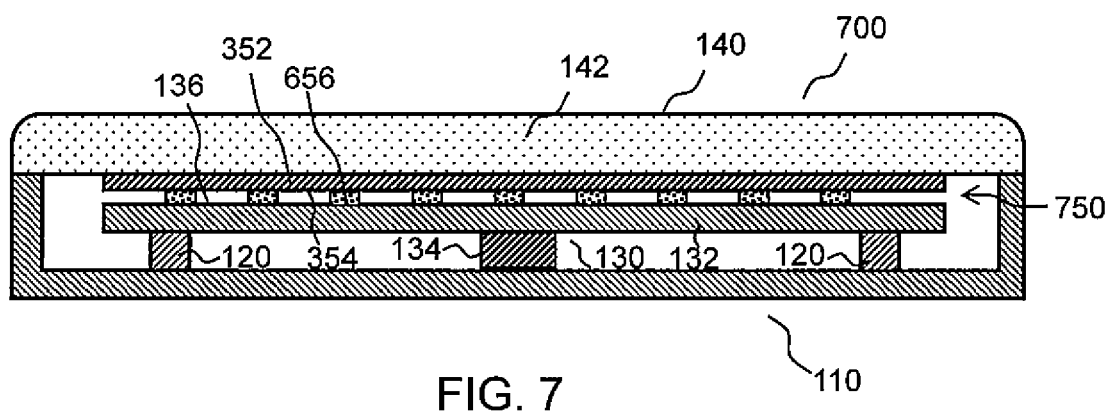
FIG. 7 shows a schematic diagram of a front cross-sectional view of a wrist rest, wherein the feature and/or limitation relating to the one or more lubricating pad on the surface (or the top surface) of the vibration member of the vibration assembly of the wrist rest of FIG. 6 is combined with the wrist rest of FIG. 3, according to various embodiments.

As an example illustrating that the feature and/or limitation relating the one or more lubricating pad 656 on the surface 136 (or the top surface) of the vibration member 132 of the vibration assembly 130 of the wrist rest 600 of FIG. 6 may be combined with other embodiments, FIG. 7 shows a schematic diagram of a front cross-sectional view of a wrist rest 700 wherein the feature and/or limitation relating to the one or more lubricating pad 656 on the surface 136 (or the top surface) of the vibration member 132 of the vibration assembly 130 of the wrist rest 600 of FIG. 6 is combined with the wrist rest 300 of FIG. 3 according to various embodiments. As shown in FIG. 7, according to various embodiments, the corresponding surface of the cushion assembly 140 (or the bottommost surface of the cushion assembly 140) to which the one or more lubricating pad 656 on the surface 136 (or the top surface) of the vibration member 132 of the vibration assembly 130 may be loosely abutting may be the corresponding surface 354 (or a bottom surface) of the lubricating plate 352 of the cushion assembly 140. Accordingly, the one or more lubricating pad 656 on the surface 136 (or the top surface) of the vibration member 132 of the vibration assembly 130 may be loosely abutting the corresponding surface 354 (or the bottom surface) of the lubricating plate 352 of the cushion assembly 140 in a manner such that the one or more lubricating pad 656 on the surface 136 of the vibration member 132 of the vibration assembly 130 may be in contact or may be touching the corresponding surface 354 of lubricating plate 352 without being fastened or attached or fixed or joined to each other. Hence, the vibrating motion of the vibration member 132 of the vibration assembly 130 may cause the one or more lubricating pad 656 on the surface 136 of the vibration member 132 of the vibration assembly 130 to move relative to the corresponding surface 354 of the lubricating plate 352 such that the wrist of the user resting on the wrist rest 300 may sense the vibrating motion of the vibration member 132 of the vibration assembly 130 through the cushion 142 of the cushion assembly 140 whereby the lubricating plate 352 of the cushion assembly 140 is in contact with the one or more lubricating pad 656 on the vibration member 132 of the vibration assembly 130.

According to various embodiments, the lubricating layer 750 of the wrist rest 700 of FIG. 7 may include the one or more lubricating pad 656 on the surface 136 (or the top surface) of the vibration member 132 of the vibration assembly 130 and the lubricating plate 352 of the cushion assembly 140. According to various embodiments, the one or more lubricating pad 656 on the surface 136 (or the top surface) of the vibration member 132 of the vibration assembly 130 self-lubricating such that it may reduce friction with the corresponding surface 354 (or a bottom surface) of the lubricating plate 352 of the cushion assembly 140 so as to minimise vibration losses of the vibration member 132 of the vibration assembly 130 and facilitate the relative movement between the vibration member 132 of the vibration assembly 130 and the cushion 142 of the cushion assembly 140.

Figure 8:
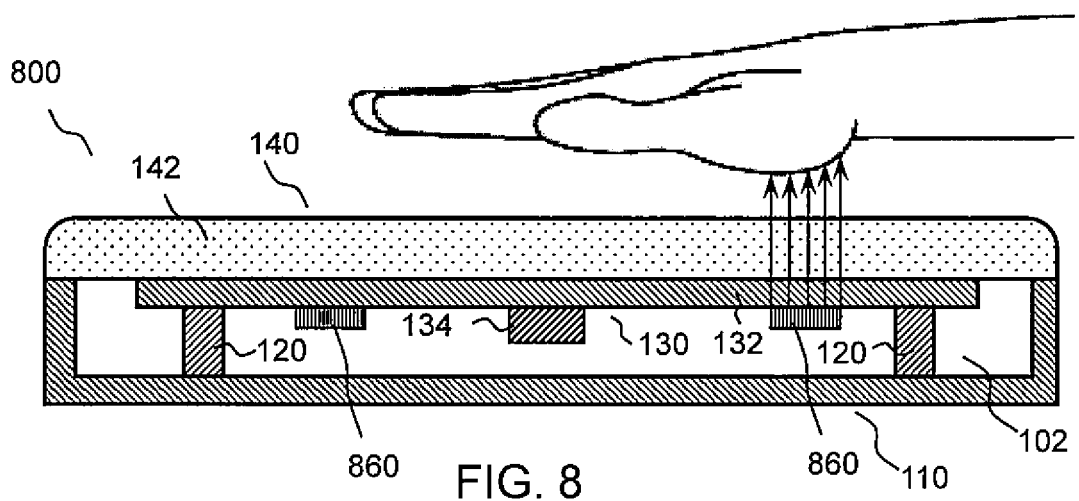
FIG. 8 shows a schematic diagram of a front cross-sectional view of a wrist rest according to various embodiments.

FIG. 8 shows a schematic diagram of a front cross-sectional view of a wrist rest 800 according to various embodiments. According to various embodiments, the wrist rest 800 of FIG. 8 may contain all the features of the wrist rest 100 of FIG. 1. Accordingly, all features, changes, modifications, and variations that are applicable to the wrist rest 100 of FIG. 1 may also be applicable to the wrist rest 800 of FIG. 8. According to various embodiments, the wrist rest 800 of FIG. 8 may differ from the wrist rest 100 of FIG. 1 in that the wrist rest 800 of FIG. 8 may include the following additional features and/or limitations. It is understood that while the additional features and/or limitations of the wrist rest 800 of FIG. 8 are described with reference to the wrist rest 100 of FIG. 1 in the following, the additional features and/or limitations of the wrist rest 800 of FIG. 8 may also be combined with the wrist rest 200 of FIG. 2A and FIG. 2B and/or the wrist rest 300 of FIG. 3 and/or the wrist rest 400 of FIG. 4 and/or the wrist rest 500 of FIG. 5 and/or the wrist rest 600 of FIG. 6 and/or the wrist rest 700 of FIG. 7 in any combination according to various embodiments.

As shown in FIG. 8, according to various embodiments, the wrist rest 800 may further include a sensor 860 configured to detect whether a body is within a pre-determined vicinity region of the wrist rest 800 so as to switch the vibration assembly 130 from a sleep mode to an operational mode upon detection of the body so as to be ready for generating the vibrating motion. According to various embodiments, the sensor 860 may serve as a 'presence sensor' to sense whether the user is using the wrist rest 800. Accordingly, if the user is not using the wrist rest 800, the haptic feedback function of the wrist rest 800 may remain off such that the vibrating motion of the vibration assembly 130 may not be generated when the wrist rest 800 is unattended. Hence, the haptic feedback function of the wrist rest 800 may only be turned on when the sensor 860 detects the user.

According to various embodiments, the sensor 860 may be electronically coupled to the actuator 134 of the vibration assembly 130. Accordingly, the sensor 860 may send a signal to the actuator 134 of the vibration assembly 130 upon detecting the user so as to switch the actuator 134 of the vibration assembly 130 from the sleep mode to the operational mode. According to various embodiments, the sensor 860 may be electronically coupled to a power regulating circuit (not shown) that controls the supply of power to the actuator 134 of the vibration assembly 130. The power regulating circuit may be configured to only supply power to the actuator 134 of the vibration assembly 130 when the sensor 860 sends a signal to the power regulating circuit that the user is being detected and to cut off the supply of power when no such signal is received. According to various embodiments, the sensor 860 may also be electronically coupled to the processor which is in electronic communication with the actuator 134 of the vibration assembly 130. Accordingly, the sensor 860 may send a signal to the processor indicating whether the user is being detected such the processor may determine whether to the signal to the actuator 134 of the vibration assembly 130 for generating haptic feedback.

According to various embodiments, the sensor 860 may include proximity type sensor and/or contact type sensor. According to various embodiments, the proximity type sensor may be non-contact type sensor that is configured to detect the presence of an object. According to various embodiments, the proximity type sensor may include capacitive sensor, optical sensor, infrared sensor, laser sensor, light sensor, ultrasonic sensor, hall-effect sensor etc. According to various embodiments, the contact type sensor may include pressure sensor, touch sensor, force sensor, strain sensor, piezoelectric sensor, switch, etc.

According to various embodiment, depending on what is the type for the sensor 860, the sensor 860 may be suitably disposed with respect to the wrist rest 800. According to various embodiments, the sensor 860 may be embedded within the cushion 142 of the cushion assembly 140, the sensor 860 may be disposed between the cushion assembly 140 and the vibration assembly 130, the sensor 860 may be disposed underneath the vibration member 132 of the vibration assembly 130, the sensor 860 may be disposed on the base structure 110, the sensor 860 may be disposed in the internal space 102 of the wrist rest 800, or the sensor 860 may be disposed on an exterior of the wrist rest 800.

For example in FIG. 8, it is illustrated that the sensor 860 may be a proximity type sensor which may be disposed underneath the vibration member 132 of the vibration assembly 130. It is understood that FIG. 8 is provided as an example only and various embodiments are not limited to the example as illustrated.

FIG. 9A shows a schematic diagram of a front cross-sectional view of a wrist rest 900 according to various embodiments. According to various embodiments, the wrist rest 900 of FIG. 9A may contain all the features of the wrist rest 100 of FIG. 1. Accordingly, all features, changes, modifications, and variations that are applicable to the wrist rest 100 of FIG. 1 may also be applicable to the wrist rest 900 of FIG. 9A. According to various embodiments, the wrist rest 900 of FIG. 9A may differ from the wrist rest 100 of FIG. 1 in that the wrist rest 900 of FIG. 9A may include the following additional features and/or limitations. It is understood that while the additional features and/or limitations of the wrist rest 900 of FIG. 9A are described with reference to the wrist rest 100 of FIG. 1 in the following, the additional features and/or limitations of the wrist rest 900 of FIG. 9A may also be combined with the wrist rest 200 of FIG. 2A and FIG. 2B and/or the wrist rest 300 of FIG. 3 and/or the wrist rest 400 of FIG. 4 and/or the wrist rest 500 of FIG. 5 and/or the wrist rest 600 of FIG. 6 and/or the wrist rest 700 of FIG. 7 and/or the wrist rest 800 of FIG. 8 in any combination according to various embodiments.

FIG. 9B shows a front view of the flexible support 120 of the wrist rest 900 of FIG. 9A according to various embodiments. FIG. 9C shows a front cross-sectional view of the flexible support 120 of the wrist rest 900 of FIG. 9A according to various embodiments. As shown, according to various embodiments, the flexible support 120 may include a hollow pillar-like structure 922. The hollow pillar-like structure 922 of the flexible support 120 may include a base flange 924, a top flange 926, and a circumferential bulge 928 along the hollow pillar-like structure 922 between the base flange 924 and the top flange 926. According to various embodiments, the sidewall of the hollow pillar-like structure 922 of the flexible support 120 may have a uniform thickness such that a profile of an inner channel 921 may be at least substantially straight with a widen circumferential cavity 927 at the region of the circumferential bulge 928 of the hollow pillar-like structure 922 of the flexible support 120. According to various embodiments, the overall shape and configuration of the flexible support 120, in particular the circumferential bulge 928 of the flexible support 120, may facilitate the flexible support 120 to be bendable and/or pliable such that the flexible support 120 may bend or flex or sway or twist or deflect accordingly so as to absorb or damp the vibrating motion in the x-y plane with respect to the vibration member 132 of the vibration assembly 130, and the flexible support 120 may also stretch or compress or buckle or flex or twist or distort or deform accordingly so as to absorb or damp the vibrating motion in the z-direction with respect to the vibration member 132 of the vibration assembly 130.

According to various embodiments, the top flange 926 and the circumferential bulge 928 of the flexible support 120 may be configured to clamp a corresponding part of the vibration member 132 of the vibration assembly 130. Accordingly, the flexible support 120 may be fitted to the vibration member 132 of the vibration assembly 130 with the top flange 926 of the flexible support 120 on one side of the vibration member 132 and the circumferential bulge 928 on another side of the vibration member 132. Hence, a neck portion 925 of the flexible support 120 between the top flange 926 and the circumferential bulge 928 of the flexible support 120 may be extending through the corresponding part of the vibration member 132 of the vibration assembly 130 such that the top flange 926 may be on one side of the corresponding part of the vibration member 132 and the circumferential bulge 928 may be on another side of the corresponding part of the vibration member 132.

According to various embodiments, the bottom flange 924 may be configured to be fixed to the base structure 110. According to various embodiments, the bottom flange 924 may be fixed to the base structure 110 via adhesive or glue.

FIG. 9D shows a perspective view of the vibration member 132 of the vibration assembly 130 of the wrist rest 900 of FIG. 9A according to various embodiments. As shown, the vibration member 132 of the vibration assembly 130 may include fork-like elements 938 at each end 131, 133 of the vibration member 132. According to various embodiments, each fork-like element 938 may include two prongs 939. According to various embodiments, a root portion 937 of the fork-like element 938 between the two prongs 939 may be of a shape corresponding to half a cross-sectional profile of the neck portion 925 of the flexible support 120 such that the neck portion 925 of the flexible support 120 may slide between the two prongs 939 of the fork-like element 938 to sit into the root portion 937 of the fork-like element 938 with the top flange 926 of the flexible support 120 on one side of the fork-like element 938 and the circumferential bulge 928 of the flexible support 120 on another side of the fork-like element 938. According to various embodiments, the cross-sectional profile of the neck portion 925 of the flexible support 120 may be circular and the root portion 937 of the fork-like element 938 may be semi-circular.

According to various embodiments, the vibration member 132 of the vibration assembly 130 may include at least one fork-like element 938 at each end. According to various embodiments, the vibration member 132 of the vibration assembly 130 may include two fork-like elements 938 at each end. Accordingly, the vibration member 132 of the vibration assembly 130 may include four fork-like elements 938. Hence, the wrist rest 900 of FIG. 9A may include four flexible supports 120 supporting the vibration member 132 of the vibration assembly 130 above the base structure 110. It is understood that the vibration member 132 of the vibration assembly 130 according to various embodiments may include at least two fork-like elements 938, whereby there is at least one fork-like element 938 at each end of the vibration member 132 of the vibration assembly 130. Accordingly, the vibration member 132 of the vibration assembly 130 may include two or more fork-like elements 938 with at least one fork-like element 938 at each end of the vibration member 132 of the vibration assembly 130.

Figure 10B:
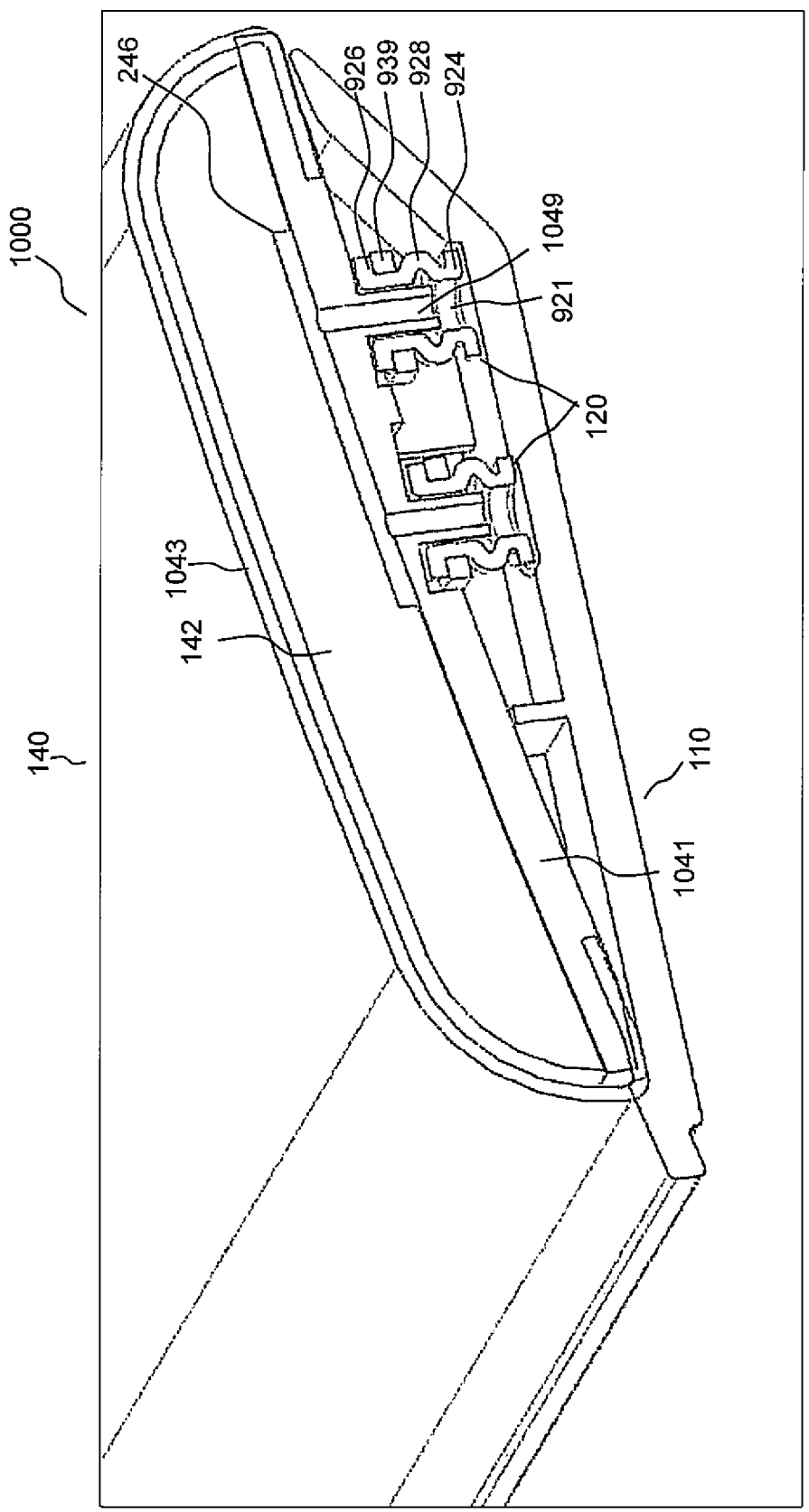
FIG. 10B shows a side cross-sectional view at an end portion of the wrist rest of FIG. 10A according to various embodiments.

FIG. 10A shows a side cross-sectional view at a midpoint of a wrist rest 1000 according to various embodiments. FIG. 10B shows a side cross-sectional view at an end portion of the wrist rest 1000 according to various embodiments. According to various embodiments, the wrist rest 1000 of FIG. 10A and FIG. 10B may contain all the features of the wrist rest 100 of FIG. 1 and a combination of the additional features and/or limitations of the wrist rest 200 of FIG. 2A and FIG. 2B and/or the wrist rest 400 of FIG. 4 and/or the wrist rest 700 of FIG. 7 and/or the wrist rest 800 of FIG. 8 and/or the wrist rest 900 of FIG. 9A to FIG. 9D. Accordingly, all features, changes, modifications, and variations that are applicable to the wrist rest 100 of FIG. 1 and/or the wrist rest 200 of FIG. 2A and FIG. 2B and/or the wrist rest 400 of FIG. 4 and/or the wrist rest 700 of FIG. 7 and/or the wrist rest 800 of FIG. 8 and/or the wrist rest 900 of FIG. 9A to FIG. 9D may also be applicable to the wrist rest 1000 of FIG. 10A and FIG. 10B.

As shown in FIG. 10A and FIG. 10B, according to various embodiments, the wrist rest 1000 of FIG. 10A and FIG. 10B may, similar to the wrist rest 100 of FIG. 1, include the base structure 110. According to various embodiments, the wrist rest 1000 of FIG. 10A and FIG. 10B may, similar to the wrist rest 100 of FIG. 1, include the at least two flexible supports 120. According to various embodiments, the wrist rest 1000 of FIG. 10A and FIG. 10B may include four flexible supports 120. According to various embodiments, the wrist rest 1000 of FIG. 10A and FIG. 10B may, similar to the wrist rest 100 of FIG. 1, include the vibration assembly 130 having the vibration member 132 and the actuator 134. According to various embodiments, the wrist rest 1000 of FIG. 10A and FIG. 10B may, similar to the wrist rest 100 of FIG. 1, include the cushion assembly 140 having the cushion 142. According to various embodiments, the wrist rest 1000 of FIG. 10A and FIG. 10B may, similar to the wrist rest 200 of FIG. 2A and FIG. 2B, include that the cushion 142 of the cushion assembly 140 may include a recessed portion 246. According to various embodiments, the wrist rest 1000 of FIG. 10A and FIG. 10B may, similar to the wrist rest 900 of FIG. 9A to FIG. 9D, include that each of the at least two flexible supports 120 include the hollow pillar-like structure 922 having a base flange 924, a top flange 926, and a circumferential bulge 928 along the hollow pillar-like structure 922 between the base flange 924 and the top flange 926. According to various embodiments, the wrist rest 1000 of FIG. 10A and FIG. 10B may, similar to the wrist rest 900 of FIG. 9A to FIG. 9D, include that the vibration member 132 of the vibration assembly 130 may include the fork-like elements 938, each fork-like element 938 having two prongs 939. According to various embodiments, the wrist rest 1000 of FIG. 10A and FIG. 10B may, similar to the wrist rest 400 of FIG. 4, include that the vibration member 132 of the vibration assembly 130 having the bumps or rounded protrusions 454 (not shown in FIG. 10A or FIG. 10B). According to various embodiments, the wrist rest 1000 of FIG. 10A and FIG. 10B may, similar to the wrist rest 600 of FIG. 6, include that the vibration member 132 of the vibration assembly 130 having the one or more lubricating pad 656 (not shown in FIG. 10A or FIG. 10B) made of self-lubricating material. According to various embodiments, the wrist rest 1000 of FIG. 10A and FIG. 10B may, similar to the wrist rest 800 of FIG. 8, include the sensor 860 (not shown in FIG. 10A or FIG. 10B).

As shown in FIG. 10A and FIG. 10B, according to various embodiments, the cushion assembly 140 of the wrist rest 1000 may further include a cushion-mount 1041 and a cushion-wrap 1043. According to various embodiments, the cushion 142 of the cushion assembly 140 may be placed on the cushion-mount 1041 with the cushion-wrap 1043 wrapped over the cushion 142 and fixed to the cushion-mount 1041 in a manner so as to bundle the cushion 142 to the cushion-mount 1041. According to various embodiments, the cushion-mount 1041 may be attached to the base structure 110. Accordingly, the cushion 142 of the cushion assembly 140 may be secured to the base structure 110 via the cushion-mount 1041. Further, with the cushion-wrap 1043 covering the cushion 142 and the cushion-wrap 1043 fixed to the cushion-mount 1041, the cushion-wrap 1043 may smoothen a shape of the cushion 142. According to various embodiments, the cushion-wrap 1043 may be a leather wrap. According to various embodiments, the cushion-mount 1041 may include attachment elements 1045 configured to attach to the base structure 110. According to various embodiments, the cushion-mount 1041 may include at least two insert elements 1049, each insert element configured to be loosely inserted into the inner channel 921 of the flexible support 120.

Figure 11:
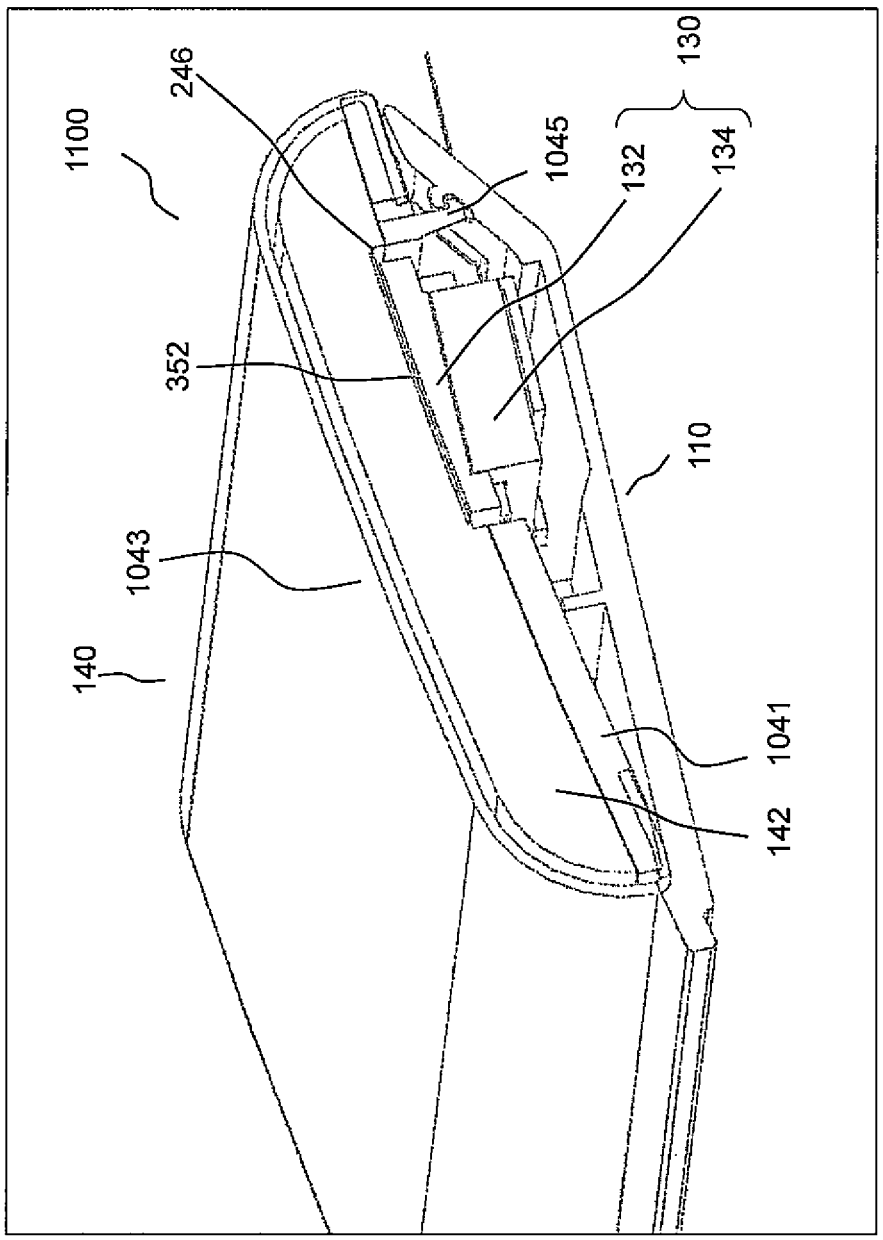
FIG. 11 shows a side cross-sectional view at a midpoint of a wrist rest according to various embodiments.

FIG. 11 shows a side cross-sectional view at a midpoint of a wrist rest 1100 according to various embodiments. According to various embodiments, the wrist rest 1100 of FIG. 11 may contain all the features of the wrist rest 1000 of FIG. 10A and FIG. 10B. Accordingly, all features, changes, modifications, and variations that are applicable to the wrist rest 1000 of FIG. 10A and FIG. 10B may also be applicable to the wrist rest 1000 of FIG. 10A and FIG. 10B. According to various embodiments, the wrist rest 1100 of FIG. 11 may, similar to the wrist rest 300 of FIG. 3, further include that the cushion assembly 140 may include the lubricating plate 352.

Figure 12:
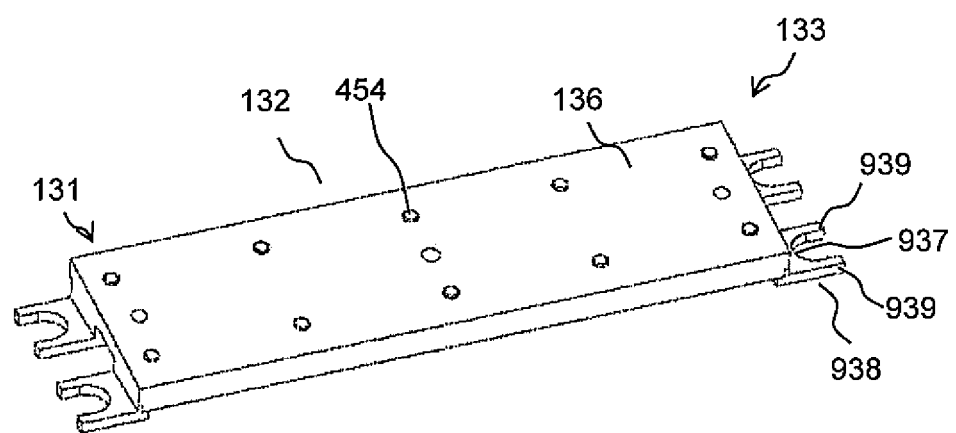
FIG. 12 shows a perspective view of a variant of the vibration member of a wrist rest according to various embodiment.

FIG. 12 shows a perspective view of a variant of the vibration member 132 of a wrist rest according to various embodiments. As shown, the vibration member 132 may include fork-like elements 938 at each end 131, 133 of the vibration member 132. According to various embodiments, each fork-like element 938 may include two prongs 939. According to various embodiments, each fork-like element 938 may include a root portion 937 between the two prongs 939. According to various embodiments, the vibration member 132 may include bumps or rounded protrusions 454 projecting from the surface 136 (or the top surface) of the vibration member 132. According to various embodiments, the vibration member 132 of FIG. 12 may be incorporated into the wrist rest 100 of FIG. 1, the wrist rest 200 of FIG. 2A, wrist rest 300 of FIG. 3, the wrist rest 400 of FIG. 4, the wrist rest 500 of FIG. 5, the wrist rest 800 if FIG. 8, the wrist rest 900 of FIG. 9A, the wrist rest 1000 of FIG. 10A and FIG. 10B, and the wrist rest 1100 of FIG. 11.

The following examples pertain to various embodiments.

Example 1 is a wrist rest including:

a base structure;

at least two flexible supports extending from the base structure;

a vibration assembly supported on the at least two flexible supports in a manner such that the vibration assembly is spaced apart from the base structure by the at least two flexible supports;

a cushion assembly comprising a cushion disposed over the vibration assembly in a manner so as to conceal the vibration assembly between the base structure and the cushion, wherein the cushion is secured to the base structure, wherein the at least two flexible supports are configured to isolate the base structure from a vibrating motion of the vibration assembly, and wherein the vibrating motion of the vibration assembly causes a surface of the vibration assembly directed towards the cushion assembly to move relative to a corresponding surface of the cushion assembly directed towards the vibration assembly in a manner so as to allow the vibration motion of the vibration assembly to be sensed through the cushion of the cushion assembly.

In Example 2, the subject matter of Example 1 may optionally include that the vibration assembly may include a vibration member and an actuator. The vibration member may be supported by the at least two flexible supports, and the actuator may be coupled underneath the vibration member and between the at least two flexible supports so as to be suspended from the vibration member.

In Example 3, the subject matter of Example 2 may optionally include that the vibration member include a vibration plate.

In Example 4, the subject matter of any one of Examples 1 to 3 may optionally include that the at least two flexible supports are made of rubber.

In Example 5, the subject matter of any one of Examples 1 to 4 may optionally include that each of the at least two flexible supports comprises a hollow pillar-like structure having a base flange, a top flange, and a circumferential bulge along the hollow pillar-like structure between the base flange and the top flange.

In Example 6, the subject matter of Example 5 insofar as including the subject matter of Example 2 may optionally include that the top flange and the circumferential bulge may be configured to clamp a corresponding part of the vibration member, and wherein the bottom flange may be configured to be fixed to the base structure.

In Example 7, the subject matter of any one of Examples 1 to 6 insofar as including the subject matter of Example 2 may optionally include that the cushion of the cushion assembly may include a recessed portion and wherein the cushion may be disposed over the vibration member of the vibration assembly with the vibration member arranged within the recessed portion, and wherein the recessed portion of the cushion may be larger than the vibration member of the vibration assembly.

In Example 8, the subject matter of any Example 7 may optionally include that a fluid or gel may be filled between the recessed portion of the cushion and the vibration member of the vibration assembly.

In Example 9, the subject matter of any one of the preceding Examples insofar as including the subject matter of Example 2 may optionally include that the cushion assembly may include a lubricating plate fixedly attached to a side of the cushion of the cushion assembly directed towards the vibration member of the vibration assembly in a manner so as to be opposing and facing the vibration member of the vibration assembly such that the lubricating plate may be in direct contact with the vibration member of the vibration assembly.

In Example 10, the subject matter of any one of the preceding Examples insofar as including the subject matter of Example 2 may optionally include that a surface of the vibration member of the vibration assembly directed towards the cushion assembly may include bumps or rounded protrusions projecting therefrom.

In Example 11, the subject matter of any one of the preceding Examples insofar as including the subject matter of Example 2 may optionally include that a surface of the vibration member of the vibration assembly directed towards the cushion assembly may include one or more lubricating pads attached thereon, wherein the one or more lubricating pads are made of self-lubricating material.

In Example 12, the subject matter of any one of Examples 1 to 11 may optionally include that the cushion assembly may further include a cushion-mount and a cushion-wrap, wherein the cushion may be placed on the cushion-mount with the cushion-wrap wrapped over the cushion and fixed to the cushion-mount in a manner so as to bundle the cushion to the cushion-mount, and wherein the cushion-mount may be attached to the base structure.

In Example 13, the subject matter of any one of Examples 1 to 12 may optionally include a sensor configured to detect whether a body is within a pre-determined vicinity region of the wrist rest so as to switch the vibration assembly from a sleep mode to an operational mode upon detection of the body so as to be ready for generating the vibrating motion.

Example 14 is a wrist rest including:

a base structure;

at least two flexible supports extending from the base structure;

a vibration assembly comprising a vibration member and an actuator, wherein the vibration member is supported on the at least two flexible supports in a manner such that the vibration member is spaced apart from the base structure by the at least two flexible supports, and wherein the actuator is coupled underneath the vibration member and between the at least two flexible supports so as to be suspended from the vibration member;

a cushion assembly comprising a cushion disposed over the vibration assembly in a manner so as to conceal the vibration assembly between the base structure and the cushion, wherein the cushion is secured to the base structure; and a lubricating layer between the vibration member of the vibration assembly and the cushion of the cushion assembly, wherein the at least two flexible supports are configured to isolate the base structure from the vibrating motion of the vibration assembly, wherein the vibrating motion of the vibration member of the vibration assembly causes a surface of the vibration member of the vibration assembly directed towards the cushion assembly to move relative to a corresponding surface of the cushion of the cushion assembly directed towards the vibration assembly, and wherein the lubricating layer is configured to minimise vibration losses of the vibration member of the vibration assembly and facilitate the relative movement between the vibration member of the vibration assembly and the cushion of the cushion assembly In Example 15, the subject matter of Example 14 may optionally include that the vibration member include a vibration plate.

In Example 16, the subject matter of Example 14 or 15 may optionally include that the at least two flexible supports are made of rubber.

In Example 17, the subject matter of any one of Examples 14 to 16 may optionally include that each of the at least two flexible supports may include a hollow pillar-like structure having a base flange, a top flange, and a circumferential bulge along the hollow pillar-like structure between the base flange and the top flange.

In Example 18, the subject matter of Example 17 may optionally include that the top flange and the circumferential bulge may be configured to clamp a corresponding part of the vibration member, and wherein the bottom flange may be configured to be fixed to the base structure.

In Example 19, the subject matter of any one of Examples 14 to 18 may optionally include that the lubricating layer comprises a lubricating plate fixedly attached to the corresponding surface of the cushion of the cushion assembly in a manner so as to be opposing and facing the surface of the vibration member of the vibration assembly such that the lubricating plate is in direct contact the vibration member of the vibration assembly.

In Example 20, the subject matter of any one of Examples 14 to 19 may optionally include that the lubricating layer may include bumps or rounded protrusions along the surface of the vibration member of the vibration assembly.

In Example 21, the subject matter of any one of Examples 14 to 19 may optionally include that the lubricating layer may include one or more lubricating pad made of self-lubricating material attached to the surface of the vibration member of the vibration assembly.

In Example 22, the subject matter of any one of Examples 14 to 21 may optionally include that a cushion-mount and a cushion-wrap, wherein the cushion may be placed on the cushion-mount with the cushion-wrap wrapped over the cushion and fixed to the cushion-mount in a manner so as to bundle the cushion to the cushion-mount, and wherein the cushion-mount may be attached to the base structure.

In Example 23, the subject matter of any one of Examples 14 to 22 may optionally include that a sensor may be configured to detect whether a body is within a pre-determined vicinity region of the wrist rest so as to switch the vibration assembly from a sleep mode to an operational mode upon detection of the body so as to be ready for generating the vibration motion.

Example 24 is a wrist rest including:

a base structure;

at least two flexible supports extending from the base structure;

a vibration assembly comprising a vibration member and an actuator, wherein the vibration member is supported on the at least two flexible supports in a manner such that the vibration member is spaced apart from the base structure by the at least two flexible supports, and wherein the actuator is coupled underneath the vibration member and between the at least two flexible supports so as to be suspended from the vibration member;

a cushion assembly comprising a cushion which is disposed over the vibration assembly in a manner so as to conceal the vibration assembly between the base structure and the cushion, wherein the cushion is secured to the base structure; and a lubricating plate fixedly attached to a side of the cushion of the cushion assembly directed towards the vibration plate, wherein a vibrating motion of the vibration member of the vibration assembly causes a surface of the vibration member of the vibration assembly directed towards the cushion assembly to move relative to a corresponding surface of the lubricating plate directed towards the vibration assembly, wherein the at least two flexible supports is configured to isolate the base structure from the vibrating motion of the vibration assembly, and wherein the lubricating plate is in contact with the vibration member of the vibration assembly to minimise vibration losses of the vibration member of the vibration assembly and facilitate the relative movement between the vibration member of the vibration assembly and the cushion of the cushion assembly.

In Example 25, the subject matter of Example 24 may optionally include that the at least two flexible supports are made of rubber.

In Example 26, the subject matter of Example 24 or 25 may optionally include that each of the at least two flexible supports comprises a hollow pillar-like structure having a base flange, a top flange, and a circumferential bulge along the hollow pillar-like structure between the base flange and the top flange.

In Example 27, the subject matter of Example 26 may optionally include that the top flange and the circumferential bulge may be configured to clamp a corresponding part of the vibration assembly, and wherein the bottom flange may be configured to be fixed to the base structure.

In Example 28, the subject matter of any one of Examples 24 to 27 may optionally include that the surface of the vibration member of the vibration assembly directed towards the cushion of the cushion assembly may include bumps, or rounded protrusions, or one or more lubricating pad made of self-lubricating material.

In Example 29, the subject matter of any one of Examples 24 to 28 may optionally include that the cushion assembly may further include a cushion-mount and a cushion-wrap, wherein the cushion may be placed on the cushion-mount with the cushion-wrap wrapped over the cushion and fixed to the cushion-mount in a manner so as to bundle the cushion to the cushion-mount, and wherein the cushion-mount may be attached to the base structure.

In Example 30, the subject matter of any one of Examples 24 to 29 may optionally include that a sensor may be configured to detect whether a body is within a pre-determined vicinity region of the wrist rest so as to switch the vibration assembly from a sleep mode to an operational mode upon detection of the body so as to be ready for generating the vibration motion Various embodiments have provided a wrist rest which may generate haptic feedback in a refined and subtle manner. Various embodiments have provided a wrist rest which may deliver haptic sensation to a user in an elegant and subtle manner which may not cause much discomfort to the user and/or may not interfere with the user's usage of the input device While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A wrist rest, comprising:
   a base structure;
   at least two flexible supports extending from the base structure;
   a vibration assembly supported on the at least two flexible supports in a manner such that the vibration assembly is spaced apart from the base structure by the at least two flexible supports;
   a cushion assembly comprising a cushion disposed over the vibration assembly in a manner so as to conceal the vibration assembly between the base structure and the cushion, wherein the cushion is secured to the base structure,
   wherein the at least two flexible supports are configured to isolate the base structure from a vibrating motion of the vibration assembly, and
   wherein the vibrating motion of the vibration assembly causes a surface of the vibration assembly directed towards the cushion assembly to move relative to a corresponding surface of the cushion assembly directed towards the vibration assembly in a manner so as to allow the vibration motion of the vibration assembly to be sensed through the cushion of the cushion assembly,
   wherein the cushion assembly further comprises a cushion-mount and a cushion-wrap, wherein the cushion is placed on the cushion-mount with the cushion-wrap wrapped over the cushion and fixed to the cushion-mount in a manner so as to bundle the cushion to the cushion-mount, and wherein the cushion-mount is attached to the base structure.

2. The wrist rest as claimed in claim 1, wherein the vibration assembly comprises a vibration member and an actuator, wherein the vibration member is supported by the at least two flexible supports, and wherein the actuator is coupled underneath the vibration member and between the at least two flexible supports so as to be suspended from the vibration member.

3. The wrist rest as claimed in claim 2, wherein each of the at least two flexible supports comprises a hollow pillar-like structure having a base flange, a top flange, and a circumferential bulge along the hollow pillar-like structure between the base flange and the top flange.

4. The wrist rest as claimed in claim 3, wherein the top flange and the circumferential bulge are configured to clamp a corresponding part of the vibration member, and wherein a bottom flange is configured to be fixed to the base structure.

5. The wrist rest as claimed in claim 2, wherein the cushion of the cushion assembly comprises a recessed portion and wherein the cushion is disposed over the vibration member of the vibration assembly with the vibration member arranged within the recessed portion, and wherein the recessed portion of the cushion is larger than the vibration member of the vibration assembly.

6. The wrist rest as claimed in claim 5, wherein a fluid or gel is filled between the recessed portion of the cushion and the vibration member of the vibration assembly.

7. The wrist rest as claimed in claim 2, wherein the cushion assembly comprises a lubricating plate fixedly attached to a side of the cushion of the cushion assembly directed towards the vibration member of the vibration assembly in a manner so as to be opposing and facing the vibration member of the vibration assembly such that the lubricating plate is in direct contact with the vibration member of the vibration assembly.

8. The wrist rest as claimed in claim 2, wherein a surface of the vibration member of the vibration assembly directed towards the cushion assembly comprises
   bumps or rounded protrusions projecting therefrom, or
   one or more lubricating pads attached thereon, wherein the one or more lubricating pads are made of self-lubricating material.

9. The wrist rest as claimed in claim 1, further comprising a sensor configured to detect whether a body is within a pre-determined vicinity region of the wrist rest so as to switch the vibration assembly from a sleep mode to an operational mode upon detection of the body so as to be ready for generating the vibrating motion.

10. A wrist rest, comprising:
    a base structure;
    at least two flexible supports extending from the base structure;
    a vibration assembly comprising a vibration member and an actuator, wherein the vibration member is supported on the at least two flexible supports in a manner such that the vibration member is spaced apart from the base structure by the at least two flexible supports, and wherein the actuator is coupled underneath the vibration member and between the at least two flexible supports so as to be suspended from the vibration member;
    a cushion assembly comprising a cushion disposed over the vibration assembly in a manner so as to conceal the vibration assembly between the base structure and the cushion, wherein the cushion is secured to the base structure; and
    a lubricating layer between the vibration member of the vibration assembly and the cushion of the cushion assembly,
    wherein the at least two flexible supports are configured to isolate the base structure from a vibrating motion of the vibration assembly,
    wherein the vibrating motion of the vibration member of the vibration assembly causes a surface of the vibration member of the vibration assembly directed towards the cushion assembly to move relative to a corresponding surface of the cushion of the cushion assembly directed towards the vibration assembly, and
    wherein the lubricating layer is configured to minimise vibration losses of the vibration member of the vibration assembly and facilitate the relative movement between the vibration member of the vibration assembly and the cushion of the cushion assembly.

11. The wrist rest as claimed in claim 10, wherein each of the at least two flexible supports comprises a hollow pillar-like structure having a base flange, a top flange, and a circumferential bulge along the hollow pillar-like structure between the base flange and the top flange, wherein the top flange and the circumferential bulge are configured to clamp a corresponding part of the vibration member, and wherein a bottom flange is configured to be fixed to the base structure.

12. The wrist rest as claimed in claim 10, wherein the lubricating layer comprises
    a lubricating plate fixedly attached to the corresponding surface of the cushion of the cushion assembly in a manner so as to be opposing and facing the surface of the vibration member of the vibration assembly such that the lubricating plate is in direct contact the vibration member of the vibration assembly, or
    bumps or rounded protrusions along the surface of the vibration member of the vibration assembly, or one or more lubricating pad made of self-lubricating material attached to the surface of the vibration member of the vibration assembly.

13. The wrist rest as claimed in claim 10, wherein the cushion assembly further comprises a cushion-mount and a cushion-wrap, wherein the cushion is placed on the cushion-mount with the cushion-wrap wrapped over the cushion and fixed to the cushion-mount in a manner so as to bundle the cushion to the cushion-mount, and wherein the cushion-mount is attached to the base structure.

14. The wrist rest as claimed in claim 10, further comprising a sensor configured to detect whether a body is within a pre-determined vicinity region of the wrist rest so as to switch the vibration assembly from a sleep mode to an operational mode upon detection of the body so as to be ready for generating the vibration motion.

15. A wrist rest, comprising:
a base structure;
at least two flexible supports extending from the base structure;
a vibration assembly comprising a vibration member and an actuator, wherein the vibration member is supported on the at least two flexible supports in a manner such that the vibration member is spaced apart from the base structure by the at least two flexible supports, and wherein the actuator is coupled underneath the vibration member and between the at least two flexible supports so as to be suspended from the vibration member;
a cushion assembly comprising a cushion which is disposed over the vibration assembly in a manner so as to conceal the vibration assembly between the base structure and the cushion, wherein the cushion is secured to the base structure; and
a lubricating plate fixedly attached to a side of the cushion of the cushion assembly directed towards the vibration member,
wherein a vibrating motion of the vibration member of the vibration assembly causes a surface of the vibration member of the vibration assembly directed towards the cushion assembly to move relative to a corresponding surface of the lubricating plate directed towards the vibration assembly,
wherein the at least two flexible supports is configured to isolate the base structure from the vibrating motion of the vibration assembly, and
wherein the lubricating plate is in contact with the vibration member of the vibration assembly to minimise vibration losses of the vibration member of the vibration assembly and facilitate the relative movement between the vibration member of the vibration assembly and the cushion of the cushion assembly.

16. The wrist rest as claimed in claim 15, wherein each of the at least two flexible supports comprises a hollow pillar-like structure having a base flange, a top flange, and a circumferential bulge along the hollow pillar-like structure between the base flange and the top flange, wherein the top flange and the circumferential bulge are configured to clamp a corresponding part of the vibration assembly, and wherein a bottom flange is configured to be fixed to the base structure.

17. The wrist rest as claimed in claim 15, wherein the surface of the vibration member of the vibration assembly directed towards the cushion of the cushion assembly comprises bumps, or rounded protrusions, or one or more lubricating pad made of self-lubricating material.

18. The wrist rest as claimed in claim 15, wherein the cushion assembly further comprises a cushion-mount and a cushion-wrap, wherein the cushion is placed on the cushion-mount with the cushion-wrap wrapped over the cushion and fixed to the cushion-mount in a manner so as to bundle the cushion to the cushion-mount, and wherein the cushion-mount is attached to the base structure.

19. The wrist rest as claimed in claim 15, further comprising a sensor configured to detect whether a body is within a pre-determined vicinity region of the wrist rest so as to switch the vibration assembly from a sleep mode to an operational mode upon detection of the body so as to be ready for generating the vibration motion.

\* \* \* \* \*